(12) United States Patent  (10) Patent No.: US 9,307,047 B2
Chung et al.  (45) Date of Patent: Apr. 5, 2016

(54) SYSTEM AND METHOD FOR COMMUNICATION OF AN EVENT THROUGH A CALL FOR MEDIA

(71) Applicants: Scott Lee Chung, Gardena, CA (US); Theodore Lee Chung, Encino, CA (US)

(72) Inventors: Scott Lee Chung, Gardena, CA (US); Theodore Lee Chung, Encino, CA (US)

(*) Notice: Subject to any disclaimer, the term of this patent is extended or adjusted under 35 U.S.C. 154(b) by 69 days.

(21) Appl. No.: 13/964,101

(22) Filed: Aug. 11, 2013

(65) Prior Publication Data

US 2014/0047074 A1    Feb. 13, 2014

Related U.S. Application Data

(60) Provisional application No. 61/742,416, filed on Aug. 11, 2012.

(51) Int. Cl.
| | |
|---|---|
| *G06F 15/16* | (2006.01) |
| *H04L 29/08* | (2006.01) |
| *H04W 4/02* | (2009.01) |
| *H04W 4/20* | (2009.01) |

(52) U.S. Cl.
CPC ............... *H04L 67/32* (2013.01); *H04W 4/02* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 7,672,897 B2 | 3/2010 | Chung et al. | |
| 7,970,418 B2 | 6/2011 | Schmidt et al. | |
| 2004/0147255 A1* | 7/2004 | Lee ........................... | 455/422.1 |
| 2007/0156883 A1* | 7/2007 | Thompson et al. .......... | 709/223 |
| 2008/0040474 A1* | 2/2008 | Zuckerberg et al. ......... | 709/224 |
| 2011/0211534 A1 | 9/2011 | Schmidt et al. | |
| 2012/0324018 A1 | 12/2012 | Metcalf et al. | |
| 2013/0046580 A1 | 2/2013 | Harker et al. | |
| 2013/0117365 A1 | 5/2013 | Padmanabhan et al. | |
| 2013/0124653 A1 | 5/2013 | Vick et al. | |
| 2013/0128038 A1 | 5/2013 | Cok et al. | |
| 2013/0129232 A1 | 5/2013 | Cok et al. | |
| 2013/0130729 A1 | 5/2013 | Cok et al. | |
| 2013/0132477 A1* | 5/2013 | Bosworth et al. ............ | 709/204 |

FOREIGN PATENT DOCUMENTS

WO    WO/2009/029803 A1    3/2009

* cited by examiner

*Primary Examiner* — Thomas Dailey
(74) *Attorney, Agent, or Firm* — Panovia Group LLP

(57) ABSTRACT

Communication about an event is achieved through a call for media, allowing diverse forms of media such as text, audio, picture, and video to be associated with the call for media for a past, present and/or future event, an event being definable by location, a set time, an object, a state of being, an individual, any combination thereof and others, etc. Calls for media need not be stated as direct requests, but may simply be an event name, to which users may respond with related media. Associating specific communication with an event allows all forms of media used or captured to be related to the event for easier tagging, cataloging, or archiving, while also creating a way to alert others that media is desired for an event and can aggregate this media from one or many users, organize and prioritize event-related media to create presentations of the event, etc.

34 Claims, 16 Drawing Sheets

FIG. 12

SYSTEM AND METHOD FOR COMMUNICATION OF AN EVENT THROUGH A CALL FOR MEDIA

CROSS-REFERENCE TO RELATED APPLICATIONS

This application claims the benefit under 35 U.S.C. §119 (e) of U.S. Provisional Application 61/742,416, System That Utilizes Media To Respond To An Event Or Location Based Inquiry, filed Aug. 11, 2012, which is hereby incorporated herein by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

1. Field of the Invention

The invention relates generally to communication using electronic networks such as the Internet or cellular networks. More specifically, the present invention relates to a novel communication model that associates communications with an event using the Internet or cellular networks. More specifically still, the invention relates to a system and method for enabling a request for media associated with an event and coordinating responses thereto, and may be applicable to a number of fields and implementations.

2. Description of the Related Art

The standard systems of communication with electronic devices, including the Internet, cellular communications networks, etc., allow users to exchange with each other multiple forms of media, including text, audio, images, and video, among others. For instance, on a smart phone (i.e. iPhone®), an individual can communicate via multiple mediums such as instant message, phone call, email, picture, live video, etc. An individual can also communicate with more than one person at a time, such as via three-way calling, group chats, etc., to allow for group communication. In addition, an individual can broadcast information to many users over a variety of well-known platforms, such as Twitter®. These platforms allow information to flow from one to many.

These types of communication, however, do not allow an efficient way of requesting and aggregating specific media for an event. For instance, an individual absent from an event may want to know what is going on at the event. If the individual could make a call for media for the event to its attendees, they could communicate back with media, providing the user with more information about the event. Recent broadcast platforms and applications such as Twitter® are great tools for pushing information to the public. However, a system that allows the creation of a call for media for an event and automatically aggregates and associates the media to the event in a specific and customizable way might be beneficial in a large number of circumstances.

There are current systems that allow users to share live or recorded media with each other through portable electronic devices. The media that typically exist on these systems are initiated out of the user's own desire to capture the events occurring around the user. This media is generally self-initiated and is not automatically associated to the event that is being recorded or to other media that is being captured for the event. For instance, a user may want to take video of a family member's wedding and will utilize his/her smart phone or other Internet-connected or connectable device to record or share the event. However, there is a need for a convenient and flexible way for users to ask other users to capture media for an event or location and share this media for a specific event or location.

Event related media collection systems are currently known, such as those described in U.S. Published Patent Applications US2013/0130729 A1, US2013/0128038 A1, and US2013/0129232 A1. These applications, for example, tend to be highly location-dependent in their operation. For example, a user may be required to be within a certain geographic zone of a specific event in order to participate. In certain applications, however, it may be advantageous to have greater flexibility in defining an event or topic of interest regarding which media is desired. The known media collection systems also do not offer users a wide variety of definable media restrictions and do not limit media added to each collection based upon the restrictions, additional features that may also be useful in certain contexts. U.S. Published Patent Application US2011/0211534 A1 is also heavily location dependent and lacks flexibility with respect to media restrictions. Each of these applications lacks a variety of features that might be useful in certain contexts such as allowing anonymity among users, compensation for users that submit media, etc., creating a need for a more dynamic method and system that has these abilities.

Additional differences between known media collection systems and the novel communication system and method and associated features of the invention described herein will become apparent from a review of the current disclosure.

SUMMARY OF THE INVENTION

In one aspect, the invention includes a system and method that allows users to request media for an event from other users. The call for media can be for a specific form or forms of media, or any form of media, including audio, video, text, etc. Users that receive the call can respond by submitting live or recorded media of the event as a media reply to the call. This call for media function allows users to gain media information about an event by utilizing other users. The call for media can occur before, during, and/or after an event. This system and method may be achieved with any of a wide variety of devices. In one aspect, the call for media and the reply with media by users can be achieved with a portable electronic device that is connected to a wireless network, such as a smart phone, PDA (personal digital assistant), etc.

In another aspect, the invention provides to a user access to a new form of communication that allows various forms of media to be used to communicate about an event. The invention seeks to enable the creating and controlling of a call for media to engage others to submit media for an event, and to obtain more media for an event and further specify event details in which users are interested. Users may also add media restrictions to a call for media defining only specific media as acceptable media replies. Additional advantages of certain embodiments of the invention include enabling users to restrict media for an event and prioritize and organize media for a better user experience.

In another aspect, with respect to a call for media, an embodiment of the invention offers a unique communication tool allowing users to utilize each other to aggregate related media. For instance, a user can send out a call for media to other attendees of the wedding to start capturing media before the bride walks down the aisle. The other attendees of the wedding can be notified of the request and utilize their portable electronic devices to start recording the entrance of the bride. Family members that could not attend the wedding in person would then be able to experience the wedding live from multiple camera angles through the Internet. The multiple pieces of media may allow for a fuller and more in-depth experience of the event or location from different perspectives. The media can be saved and shared in the future and automatically linked together for easy retrieval and viewing. The request to capture media also allows users to possibly be reminded to capture media for the event, which they may not have had the intention to capture or would have forgotten to capture. In addition, the user's captured media is now part of something greater than just their own personal collection; the user's media is now part of a larger gathering of media that represents an event that can be publicly or privately shared.

In another aspect, in addition to personal usage, an embodiment of the invention may offer business benefits to users that can create calls for media for events. For example, if there are two engineers in the same office building and one engineer is on the top floor and another is on the bottom floor there may be equipment on the bottom floor that the engineer on the top floor needs to inspect. The engineer on the top floor of the building can send a call for media to the engineer on the bottom floor, so the top floor engineer can see live video of the equipment on the bottom floor. This can allow the engineer to more efficiently utilize his/her time by virtually inspecting equipment without having to waste time going down to the bottom floor and inspecting the equipment physically. The request for video can be sent to a specific engineer on the bottom floor or to the entire team of engineers on the bottom floor if there are multiple pieces of media needed or if there is urgency for action. The media can be captured by the bottom floor engineer and presented for inspection to the top floor engineer live or recorded. It is possible that for a single event, there is media required from multiple locations. For instance, the engineer on the top floor needs to see how the equipment on the bottom floor is reacting to equipment that is located in another city at the same time. A request for video can be sent to two different engineers at the same time in two different locations. The video captured by these two different engineers can then be displayed either at the same time or consecutively to see how different pieces of equipment are affecting one another. If both media captures are not presented live, it is possible that all media can be placed over a general time code to synch all media to see how the equipment affects each other at any given moment.

In another aspect, users may benefit by having updated media information about an event to decide where to go or how to prepare. For example, a user may want to see which nightclub or bar is popular that evening and can send a request to a few locations to see what is going on at each establishment. By enabling users to respond with media show the line outside of a nightclub or the amount of people in a bar, the captured media can now affect the receiving user's decisions on which location to attend.

In another aspect, in addition to user-generated questions/requests, a list of preset questions may be offered to users and can be determined by popularity and amount of usage by the user. The call for media not only allows a more social experience between users, but also allows for quick media answers enabling a group to be more organized or prepared. Another example of this is firemen debating between two locations that are on fire that they must immediately extinguish. If they receive video responses about the two fires, they may be able to assess which one requires a specialized response such as equipment for hazardous materials that one of their fire trucks includes. If they can request and receive video information about the different fires, they can better decide which fire truck needs to go to which location and their staff can be better prepared when they reach each fire.

In another aspect of an embodiment of the invention, calls for media and media responses may also be used for social awareness in politics or news. For instance, a news organization such as CNN could send a call for media to all users that were standing in Tahrir Square in Cairo during the Egyptian Revolution in 2011. This call for media could let CNN immediately see what was going on from the perspective of individuals in the crowd. This allows a crowd sourcing of live news around a specific event due to users replying to a query with respect to what is going on around them. The reaction of users to capture media can be immediate and the media can be shown live as it is being captured.

In another aspect of an embodiment of the invention, a customizable news source is enabled that allows certain users to act as news reporters who may themselves be stand-alone sources of information, such as through their respective media replies and/or other content. In one embodiment, a user may create a type of customizable newspaper by aggregating select reporters into a single source, e.g., a news page or feed, to get a completely customized news source. Users may be able to pay a subscription fee for each of these reporters directly or to pre-made customized sites that have already chosen a select number of reporters, among other possibilities. This aspect introduces additional revenue models. For example, in a subscription model, reporters may share the resulting revenue. Reporters may also be compensated by a portion of advertising revenue generated by content providers utilizing the reporters' media, in any of a number of ways, e.g., flat fee, based upon media view (e.g., per-click revenue), subscription fee share, etc.

In another aspect, even if the reaction of users is not immediate, the media captured can still be relevant as long as it fits certain constraints. Such as the media can still be useful as long as the user is within a geographic area or within a specific time frame from the initial request to capture media. Calls to capture media can be tagged or titled to find relation to other captured media or to incentivize capturing of specific content. For instance, the call for users to capture media in Tahrir Square can be titled "Egyptian Revolution", which may link to other revolutionary media from other events or locations. The media can also be tagged as "Arab Spring" so that the media can be related to the overall peaceful democratic movement that is occurring within the Middle East. Users can search for live media responses or go through recorded content based upon keywords, titles, or tags that can be given by specific users, any user, or automatically designated by an electronic device, among other possibilities. Users can see when a query was asked or when a media response was given and provide additional comments or related media. Users can also follow specific users, for instance if consistently great footage is coming from a college journalist on the ground in Tahrir Square, users can follow the amateur journalist and become alerted every time a new piece of media is being captured by him/her.

In another aspect, the invention enables private calls for media, for example, a private call for media among a clique of high school students privately asking each other what they are going to be wearing tomorrow. As this event is about what the high school students plan to wear tomorrow generally, this event is a type of event with no defined location. The communication of what will be worn tomorrow can best be explained via picture or video as opposed to text. In addition, any media that is used to present what will be worn tomorrow can be cataloged and referenced at a later date by the keywords used within the call for media. General questions for each event can be presented to users so that users can easily make calls for media based on general questions or further details added to general questions. The type of event can further limit the possible questions and focus the call for media to desired media. For example, the event concerning high school students asking each other what they are wearing tomorrow can be classified as a direct call for media, as the user is contacting specific users as opposed to the general public. In addition, within the choice of direct call for media, one of the standard questions could be "what are you wearing tomorrow?" A user can select that question with the only allowable media reply being either pictures or video. Then the user can choose who will directly receive the call for media out of a list of contacts and those users can immediately receive the call for media. Even with no defined location for an event, this system and method can still be utilized to request and pool media for this event.

In another aspect, the system and method of the invention are based around public calls for media that are calls for media that are not directly made to specific contacts. Calls for media can be sent to the general public, users that subscribe to specific keywords within the call for media, users that subscribe to a specific user, users that subscribe to a specific location (which herein includes a region or area), particular users based on their user information/history/activity/or interests/preferences, a specific location/region, and/or users that are in a specific location/region, among other possibilities. For instance, a public call for media can be made to all users currently listening to a radio station to show the radio personality what they are currently doing. The call for media can be announced via the radio station and sent to users via an application loaded on the user's electronic device that have subscribed to the radio station. If the radio station is broadcast via the Internet, the listeners of the station could be located around the world and any subscribed user would receive the call for media. All the responses through the application could be uploaded on the radio station website for public display and further talked about on the radio station. There could be a cutoff time for this call for media that ends the call of media and prevents any further media replies after a certain time. A cutoff time can be set for this call for media due to a radio personality wanting immediate responses from the radio audience and has little need for media replies after his or her time on the radio is over. This call for media is not subject to any specific location, however it is still an event for which media replies may be submitted.

In addition, in another aspect, as described in detail herein, a call for media, such as the call for media from the radio station, can have media restrictions. Media restrictions are restrictions set for the media replies received for a call for media. Media restrictions can be based upon user information, a location where media was captured, a time at which media was captured, etc. For instance, there could be blacklisted users who are not allowed to submit media replies due to their account status. Media restrictions based upon time are based upon when media was captured, so for instance the media restriction for time could be set to a one-hour window from when the call for media was made from the radio station or it could be set from 1 PM to 2 PM EST. If the time media restriction window is set to close an hour after the call for media was sent, this means that only media that was captured within that hour will be allowed as a media reply to the call for media. The cutoff time could be two hours from when the call for media was made, allowing users to submit their captured media from the first hour for up to one more additional hour before all media replies will not be allowed. Media restrictions allow for media replies that have a higher chance of being desired media by only allowing media that meets certain requirements.

In another aspect, the invention enables a media presentation system and method for event related media. By prioritizing and organizing media gathered for an event, the media can be experienced in chronological order with the highest priority media of each media type presented first. For instance, if there are multiple videos submitted for an event, there could be instances of the same media type being received, such as two video files that have captured the same time for the same event. There is a possibility of one the video files being of better quality than the other, and to best experience the event only the better quality video file should be played. Therefore the system is able to filter through the available event related media and choose the best possible media to represent the event. The prioritization and organization of event related media could also involve the user who is experiencing the event or the technology that is being used to experience the event. Examples of the various types of presentations that can be created and what affects the creation of these presentations are disclosed herein.

BRIEF DESCRIPTION OF THE DRAWINGS

FIG. 12 illustrates an embodiment of a format for files in a user record and a call for media record in accordance with the invention;

DETAILED DESCRIPTION OF THE INVENTION

Figure 1:
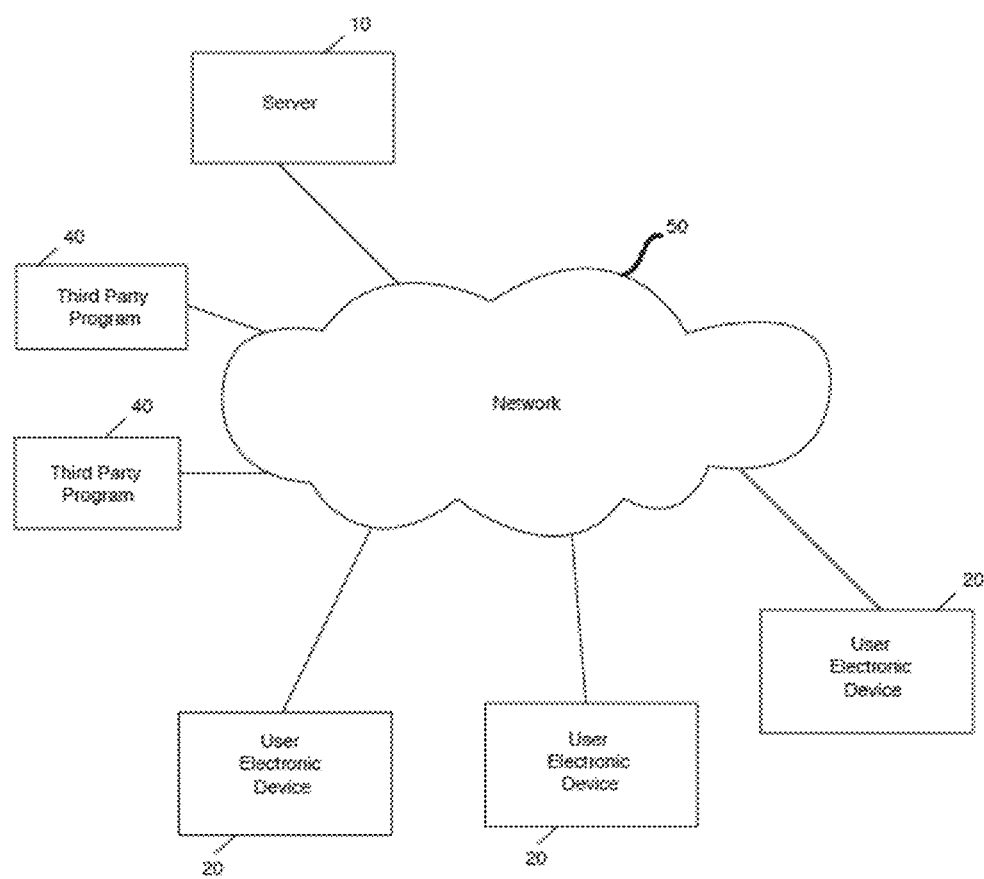
FIG. 1 illustrates an embodiment of a network computing environment in which the invention may be implemented.

In the following detailed description of the invention, reference is made to the figures, which illustrate exemplary specific embodiments of the invention. It should be understood that varied or additional embodiments having different structures or methods of operation might be used without departing from the scope and spirit of the disclosure.

In one embodiment, the invention, which may be implemented or embodied as a system, method, computer-readable media or a combination thereof, etc., is directed to a communication environment enabling users to send out a call for media for an event. The invention pools together media replies to a call for media and aggregate various media related to an event. Media restrictions can be set with respect to specific media types allowed to be used in response to a particular call for media. Thus, the invention creates a communication system that associates media to an event as users are replying with media to a call for media for an event. In addition, the invention enables a system that allows users to request media for an event from specific users and creates a community where users can share calls for media and media replies for events privately or publicly.

The invention may be applied to past, current, and/or future events. Calls for media can have a cutoff time that is the ending date or time window for media replies. The cutoff time for calls for media allows media to be obtained within a specific time period and may establish a sense of urgency to submit media. This may be especially useful when, for example, a user wants to know information with immediacy or when media can affect a user's current or future decision. Calls for media and notifications for upcoming calls for media can be delayed and sent out at set times in the future. This delay can be useful when a reminder needs to be sent out in regards to an upcoming event or when media is needed for a definitive moment during the event. Even without a cutoff time, it is possible to only allow media that was captured during a specific time if the media can be authenticated through metadata, tags, or any other timestamp or similar technology demonstrating that the media was captured during the allowed time period for the call for media, or in accordance with any of a variety of other user- or system-definable parameters.

In addition, the invention may allow the user to experience media from an event. As there is additional information that can be associated with media, users can have further control over their media experience for an event. The invention may the organization of media sequentially, to permit viewing of media over a timeline and allowing the user can skip to any moment of the event to see the media captured at that time. Also there could be multiple forms of the same media type at any given moment of the event, such as two video cameras capturing the event at the same time, such as from different viewing angles. The system can further prioritize media based upon a variety of determinants, such as video quality. One of the videos could have a high quality picture and this higher quality video might have a higher prioritization and on that basis be presented to the user first.

In one embodiment, the present invention may be utilized in other forms of communication. The call for media is not limited to direct communication and can be indirectly distributed through mediums such as television, blogs, and the radio. While users that reply may not be able to reply via the medium through which they received the call for media, it is possible that they be made aware of the call for media through these mediums. The call for media can also be distributed directly to contacts through mediums such as text, voice, image, and video. It is possible to directly reply to a call for media through the received medium. For instance, an email could carry a call for media, and by replying to the email with an attached picture the media is automatically associated in a system of the invention with an event. The system also allows for new chat functions such as creating a public chat about an event that users can post text or any submitted media that will then be affiliated with the event.

In the following description, reference is made to the accompanying drawings which form a part hereof and which illustrate various embodiments of the present invention. It is understood that other embodiments may be utilized and structural and operational changes may be made without departing from the scope of the present invention. The invention may be applied as a system and method, as hardware or software, or any combination thereof. For ease of reference the invention or parts of the invention are referred to or illustrated in figures as an application program, however this in no way limits the system and method to just an application program.

FIG. 1 is a schematic overview diagram of an exemplary network computing environment in which the invention may be implemented. In one embodiment, a server 10, user electronic devices 20, and third party programs 30, are linked together in communication by a network 50, such as the Internet. The network 50 may be comprised of any network system known in the art including TCP/IP based networks (e.g. an Intranet, the Internet), LAN, Ethernet, WAN, Token Ring, Cellular, etc. Alternatively, there may be separate and different networks between the components. Further, because in this embodiment, the network 50 is the Internet, there can be numerous parties using the network 50 simultaneously, although only three user electronic devices 20 and two third party programs 40 are shown for illustration purposes. In addition, user electronic devices 20 can vary from portable electronic devices (i.e. smart phones, cell phones, cameras, camcorders, tablets, laptops, etc.) to stationary electronic devices (i.e. desktops, digital television receivers, digital storage systems, camera systems, etc.). Third party programs 40 are programs that may be outside the system of the invention, but may be utilized to access information that is utilized by the system of the invention (i.e. Application Programming Interface "API", search engines, media host services, etc.).

Figure 2:
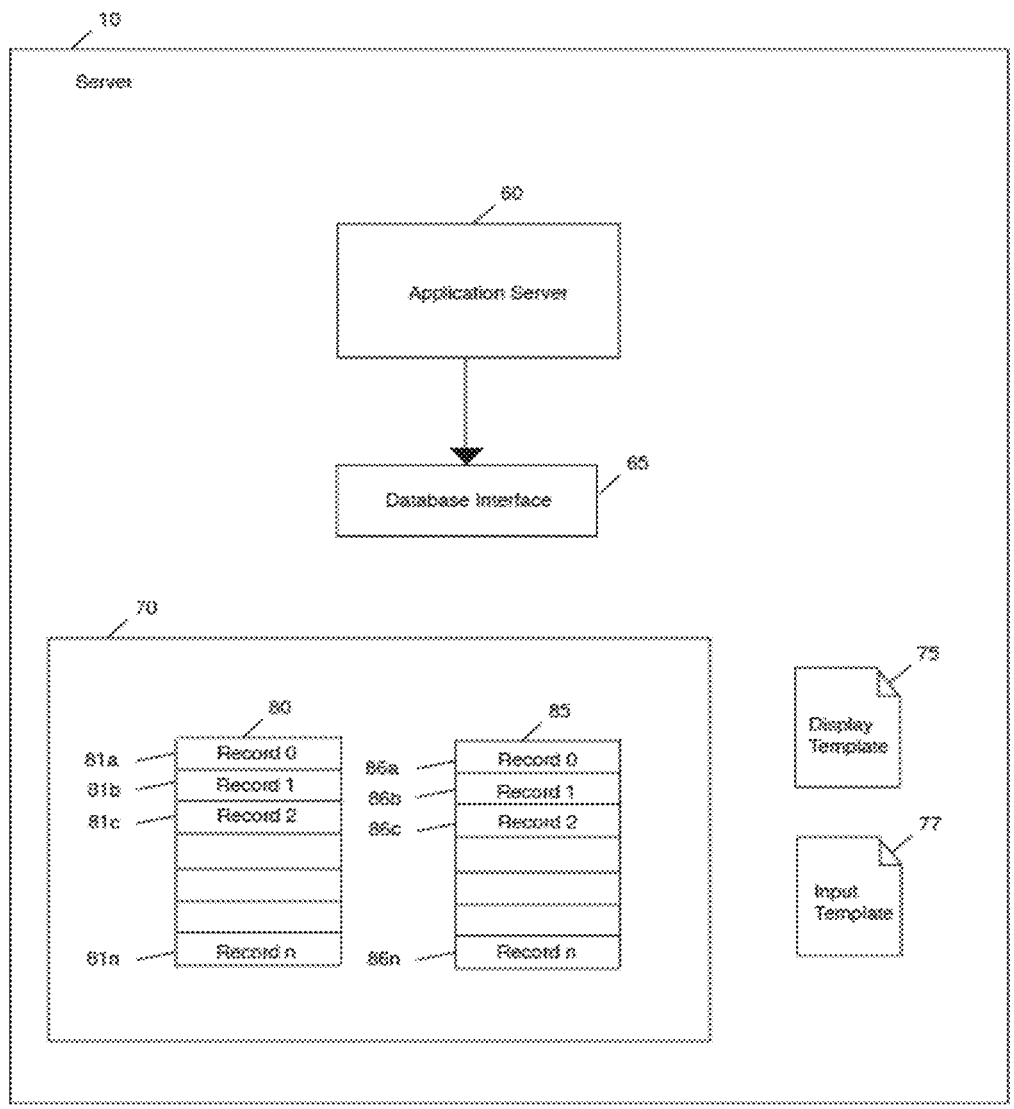
FIG. 2 illustrates an embodiment of a computing environment of a server in accordance with the invention.

In accordance with an embodiment of the invention, FIG. 2 illustrates components including server 10, including an application server 60, database 70, database interface 65 and templates 75 and 77. The application server 60 responds to requests from the user electronic devices 20, using an application client program, such as web browser programs (HTTP client programs) or any client based programs known in the art. Upon accessing the application server 60 through the network 50 using a network address, such as an IP address, the database interface 65 will give specific access to database 70 depending on the secured identification provided by the user electronic devices (i.e. unique username and password).

The database 70 keeps current, accurate information about the users and creating and updating calls for media in the communication process. The database 70 comprises of a database program known in the art, such as a relational database program. In one embodiment, the database 70 includes two database tables, user database table 80 and call for media database table 85. (Database tables 80 and 85 will be described with respect to further embodiments of the invention according to FIG. 12, but may or may not, depending upon an application, have the same structural shape and/or schema as database tables 80 and 85). User database table 80 includes user records 81a, b, . . . n that may be used in to track user information. Call for media database table 85 includes call for media records 86a, b, . . . n which is used to track calls for media.

The database interface 65 may comprise a Common Gateway Interface (CGI) program, a Java servlet, or other programmable implementation known in the art to present information in database 70 in a presentable format (e.g. HTML page, etc.). In one embodiment, the database interface 65 uses a secure login/password verification for identifying the individual user contacting the Application server 60. The assigning of a secured login/password is explained in greater detail herein. The unique identification will allow the database interface 65 to identify which user record 81a, b, n belong to the requesting party and will appropriately give read/write capabilities to the user record 81a, b, . . . n.

The server 10 further stores a display template 75 and an input template 77, which are preferably implemented in a document in which dynamic content may be generated (i.e. HTML, Extended Markup Language (XML) Document, etc.). Differing variations of the display template 75 and input template 77 exist for both user information and for call for media information, depending on the information to be displayed or inputted, but a single display template 75 and a single input template 77 are used for illustration purposes in FIG. 2. The display template 75 is used to provide the user electronic devices 20 with specific user information from the database table 80 or specific call for media information from the database table 85. The database interface 65 generates data into the display template 75 from one or more of the records 81a, b, . . . n and 86a, b, . . . n in the database 70. The input template 77 includes fields in which the user may enter information to update the user record 81a, b, . . . or n, as well as update the call for media record 86a, b, . . . n when a user interacts with a call for media.

The database 70, display template 75, and input template 77 are preferably stored in a non-volatile storage system, such as one or more hard disk drives, used by the server 10 for storage. The server 10 may load data from the storage system into volatile memory (not shown) when processing. Data can also be saved off the server with links or directions where the data is located on the network 50 (i.e. cloud storage, media hosted by other platforms, information from user accounts on other platforms, etc.), however for illustration purposes the data is depicted as being saved on the server 10.

The server 10 and user electronic devices 20 may comprise any type of computer device known in the art, including server, personal computer, mainframe, workstation, hand held device, etc. Moreover, the server 10 may comprise one or more separate computer systems to run the different program components 60, 65, and 70. A user is an individual, group, or entity that is directly utilizing the invention for communication purposes or for marketing or commerce purposes.

Figure 3:
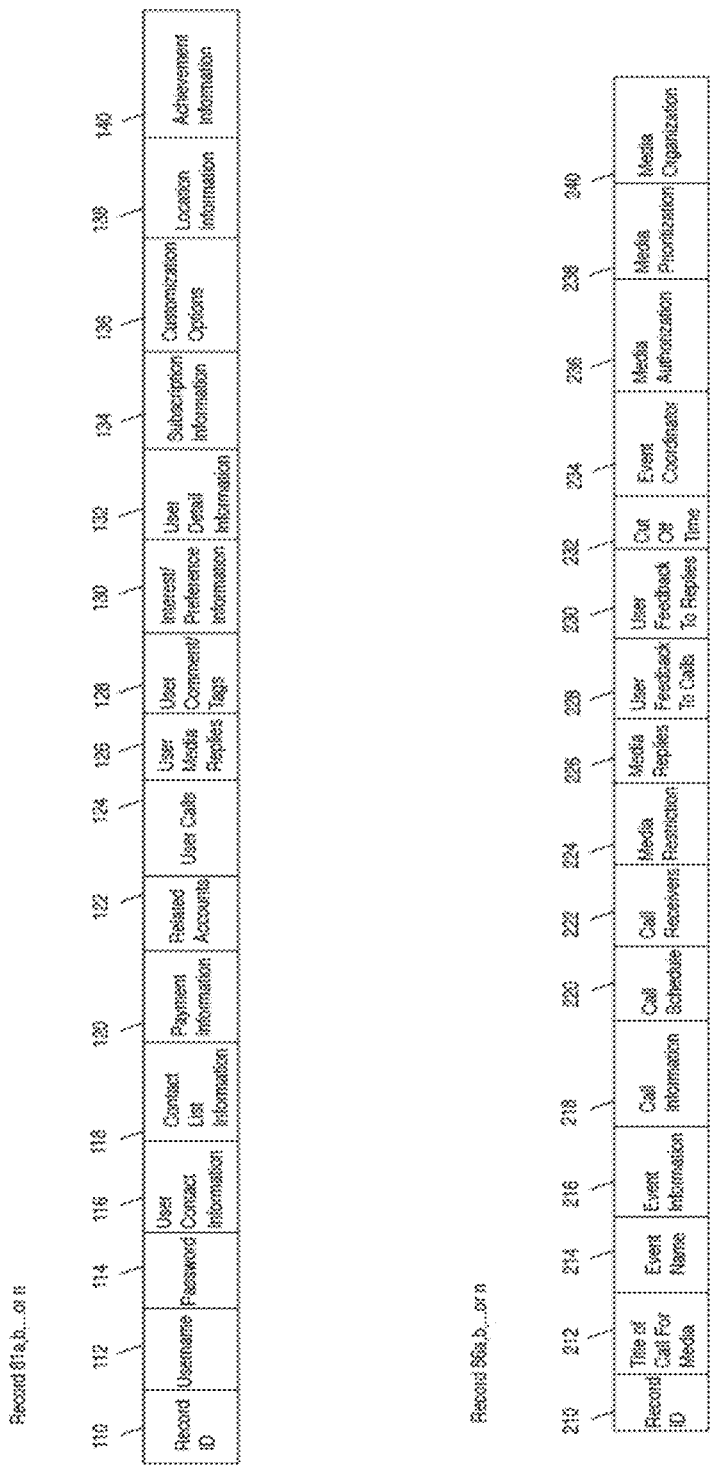
FIG. 3 illustrates an embodiment of files in a user record and a call for media record in accordance with the invention.

FIG. 3 provides an implementation of the fields in the user records 81a, b, . . . n, which include:

Record ID 110: Provides a unique identifier generated by the database interface 65 for each unique user.

Username 112: Provides a unique username that the user uses to access the user account and account related information.

Password 114: Provides a secret password created by the user used in conjunction with the username in order to access the user account and account related information.

User Contact Information 116: Provides an email address of user, phone number, address, chat id, and other contact information.

Contact List Information 118: Comprises of one or more sub-fields that contain the contacts and contact information either submitted by the user or imported from existing contact lists allowed by the user.

Payment Information 120: Comprises one or more sub-fields indicating payment information (i.e. Paypal, Bitcoin, credit card info, etc.).

Related Accounts 122: Comprises of one or more sub-fields that contain the username and passwords to other accounts online to be used to send information to or gather information from.

User Calls 124: One or more sub-fields set by the database interface 65 indicating call for media information that the user has submitted.

User Media Replies 126: One or more sub-fields set by the database interface 65 indicating information about media replies that the user has submitted.

User Comments/Tags 128: One or more sub-fields set by the database interface 65 indicating comments that the user has submitted.

Interest/Preference Information 130: One or more sub-fields set by database interface 65 providing history about the user including preferred media, events, etc. and the interests and preferences listed by the user during the Full Registration process or assumed by the system through user activity.

User Detail Information 132: One or more subfields indicating whether the user has account restrictions, type of user (i.e. individual, group, business, entity, etc.), profile details, name, address, any products/services for sale, purchase history, bank information, etc.

Subscription Information 134: Comprises of one or more sub-fields that contain the location/area, username, event, or keyword that the user will receive information on.

Customization Options 136: Comprises one or more sub-fields recording customization options on creating calls for media or viewing media for an event.

Location Information 138: One or more subfields set by database interface 65 providing information regarding the users current and past location.

Achievement Information 140: One or more subfields set by database interface 65 providing information regarding the users locked and unlocked achievements.

FIG. 3 also provides an implementation of the fields in the call for media records 86a, b, . . . n, which include:

Record ID 210: Provides a unique identifier generated by the database interface 65 for the each call for media.

Title of Call for Media 212: Provides an identifier title for each call for media.

Event Name 214: Provides an identifier name for the event the call for media is in regards to.

Event Info 216: Provides information about the event such as genre, date, duration, individuals involved, etc.

Call Info 218: Provides information on the call itself such as the user that submitted the call, if the call is public/private, if the call is sent anonymously, similar calls, any offered compensation for media replies, etc.

Call Schedule 220: Provides information about when the call or notifications about the call will be released and when the call for media expires. Also contains information about who the notifications are for or what content the notifications contain.

Call Receivers 222: Provides information about who receives the call for media. If the call is private then contains information of the contacts who the call is sent to. If the call is public then contains information of the users in the public that receive the call.

Media Restriction 224: Provides information about any media restrictions set for a call.

Media Replies 226: Provides information on media replies such as which user replied with media, when the reply was submitted, if reply is public/private, where the media can be accessed, etc.

User Feedback to Calls 228: Provides information about any user feedback to a call.

User Feedback to Replies 230: Provides information about any user feedback to a media reply.

Cutoff Time 232: Provides the set time when the call for media expires.

Event Coordinator 234: Provides information about the event coordinator for the event or call for media and any restrictions, content, etc. that the event coordinator established for an event or call for media.

Media Authorization 236: Provides media/media information that is waiting to be allowed as a reply to a call for media, media that has been turned down as a reply to media, or media replies that do not pass any media restrictions.

Media Prioritization 238: Provides the prioritization of media that is displayed when a user wants to experience media from an event.

Media Organization 240: Provides information about media playlists that the server or user has created for an event or call for media.

Those skilled in the art will appreciate that FIG. 3 illustrates an embodiment of the records 81a, b, . . . n, and 86a, b, . . . n but not the only implementation. The database tables 80 and 85 can be structured in many alternative formats to accomplish the present invention.

Typically the application process starts when a program is installed on a user electronic device 20 that allows it to communicate with the server 10. This program allows users to create calls for media and replies to calls for media. Each user will need to be registered in order to utilize the program, which can be done through the Basic and Full user registration process. In addition, users can register by using login information already created on different systems/platforms through third party programs 40. API's such as Facebook Login, allow users to use existing user account information and content that is associated with those third party accounts. User login information using accepted third party programs 40 can be used to create new user accounts. Once verified, third party user account information can create a new user record 81a, b, . . . or n. In addition, additional user information can be accessed from these third party accounts to create more comprehensive user profile that is alternatively gained through the Full Registration process. The creation of a user community through the Basic and Full Registration process to build the user database table 80 for the program will be explained in conjunction with FIG. 4 and FIG. 5.

Figure 4:
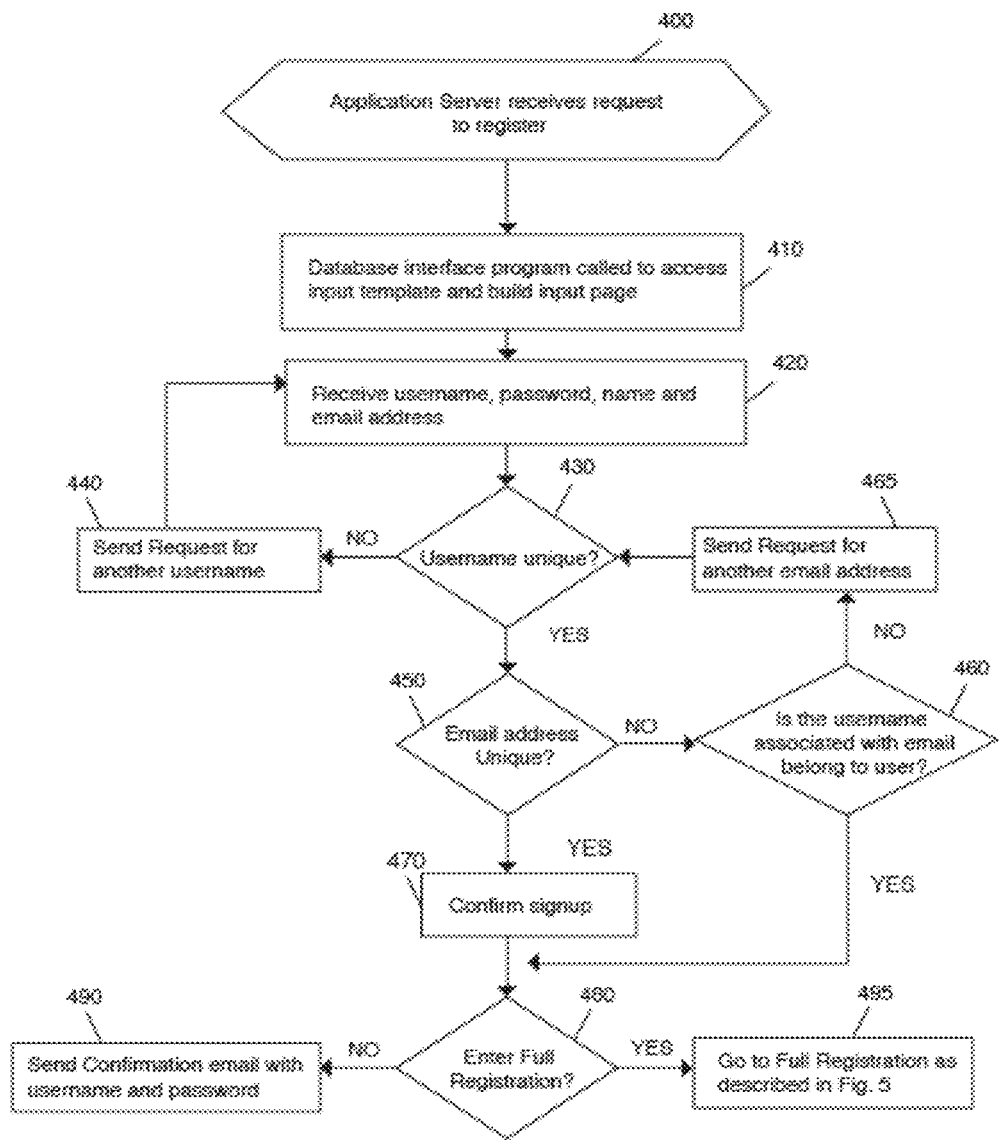
FIG. 4 illustrates an embodiment of a program flow implemented on the server to allow the user to register for Basic Registration in accordance with the invention.
Figure 5:
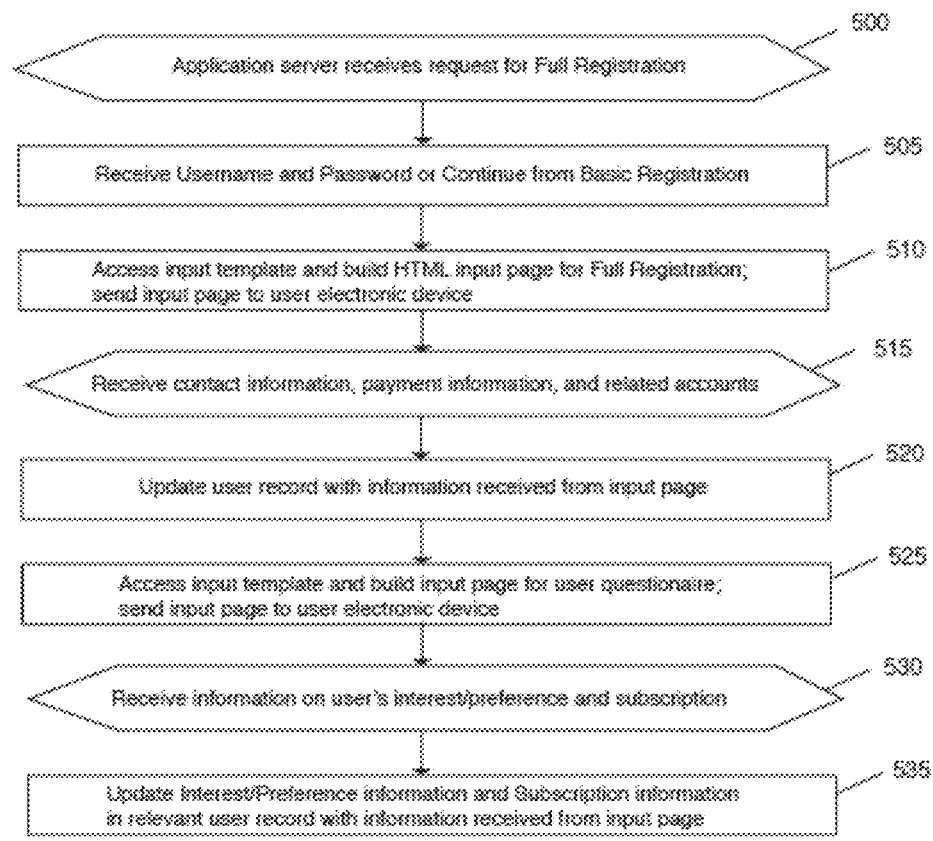
FIG. 5 illustrates an embodiment of a program flow implementation on the server to allow the user to register for Full Registration in accordance with the invention.

FIGS. 4, 5, 8, 9, 11, and 13 illustrate embodiments of the program logic embedded in the application server 60 and the database interface 65 to implement the communication process of the invention. FIG. 4 illustrates the program logic to establish a unique user record 81a, b, . . . n with basic user information ("Basic Registration"). At block 400, the application server 60 receives a request to register. At block 410, the database interface 65 accesses the input template 77 and builds another input page querying the user to input username, password, and e-mail (at block 420) and places the information in a new user record 81a, b, . . . or n the database interface 65 then checks the database table 80 to see if the username is unique (at block 430). If the username is already in use by another user record 80a, b, . . . or n, then at block 440 the database interface 65 accesses the input template 77 and builds an input page requesting the user to input another user name. The process is repeated until a unique username is assigned. At block 450, the email address is checked to see if the email entered is unique. If the email address is already in use by another user record 80a, b, . . . or n, then at block 460 the database interface 65 accesses the input template 77 and builds an input page stating that the email address is associated with an existing username, and the user is asked to confirm whether the username belongs to the user by asking for the password associated with the specific user record 81a, b, . . . or n. If the correct password is inputted, the prior user record is used and the new user record deleted. If not, then at block 465 the user is queried to input another email address. The process is repeated until a unique email is assigned to the user record 81a, b, . . . or n. At block 470, an email message is sent by the server 10 to confirm the signup by the user. Upon receiving confirmation via email or hypertext link to the confirmation page (not shown), the user will be given an option for Full Registration. If no confirmation is received within a set amount of time, the newly created user record will be deleted. At block 480, the database interface 65 will build a display page based on display template 75 which will list the benefits of full registration. Benefits of full registration may include creation of public calls for media, higher prioritization of media replies, etc. If the user decides not to signup for full registration, server 10 sends a confirmation email to user using the user Contact Information 116 associated with the user record 81a, b, . . . or n stating the Username 112 and Password 114 associated with the user record 81a, b, . . . or n. If the Full Registration option is selected, the logic of FIG. 5 is implemented from block 505.

FIG. 5 illustrates the program logic implemented in the application server 60 and the database interface 65 to enter additional information into the user record 81a, b, . . . or n for Full Registration. In order to sign up for Full Registration, a user must have already completed the Basic Registration process having a unique username and password or have utilized a verified third party API login. At block 500, once the user has completed the Basic Registration process, the user will be given the option of Full Registration. At block 505, the application server 60 receives a request from the user for the input page to convert the user record 81a, b, . . . n from Basic Registration to Full Registration. In response, the application server 60 requests (at block 510) the database interface 65, which accesses the input template 77 and builds an input page for the specified user record 81 a, b, . . . n. The built input page is then sent to the user electronic device 20, where the user can enter contact list information, payment information, and third party login information for an accepted third party API login. At block 515, the application server 60 receives the input page with the user contact information, contact list information, payment information, and third party login information. In response, the application server 60 requests the database interface 65 to update (at block 520) the User Contact Information 116, Contact List Information 118, Payment Information 120, and Related Accounts 122 of the relevant user record with the information supplied by the user. Contact List Information can be automatically pulled from sources or accessed when needed depending upon the electronic device that the user is using and the third party login information provided. For instance, if the user is using a smartphone, then the contact list for both direct phone numbers and associated email addresses can be imported into Contact List Information instead of manually entered from the smartphone. Also if the user provides third party login information, then the third party account may have contact lists such as existing Facebook friends that can be imported into Contact List Information or accessed from Facebook when needed.

In one embodiment, the Full Registration process also includes collecting additional information from the user regarding the user's interests/preferences and subscriptions. By receiving the user's interests/preferences more relevant content can by directed towards users such as type of events that align with the user's interests (i.e. rock concerts, plays, etc.) or users of similar interests/preferences. Also a user can directly subscribe to a location (i.e. venue, city, etc.), individual (i.e. celebrity, friend, etc.), or any keyword (i.e. Coca Cola, Boy Scouts, etc.) to be notified when activity is occurring that is relevant to what they have subscribed to. After receiving the preference information inputted by the user at block 530, the application server 60 requests the database interface 65 to update (at block 535) the Interest/Preference Information 130 and Subscription Information 134 of the relevant record with the information supplied by the user.

In one embodiment, a user can lift restrictions from their account by having the third party login verified through a third party program 40, submitting verified payment information, or the user database receiving certain user information through user interest/preferences. One of these processes, a combination of these processes, or parts of each process can be used together to lift restrictions on accounts. Once information is verified, the User Detail Information 132 is updated to lift certain restrictions for the specified user record such as the restrictions lifted off of an account with only Basic Registration. The additional user information that is gained from Full Registration does not need to be immediately input after a user record has been created. Users can add or change information within their existing account at a future time. As their user activity is recorded in Interest/Preference Information 130, the system is constantly updating the user record with more user information without direct user input. As user activity contributes to user information, it may be possible to release restrictions for an account record by completing certain actions within the program. In addition, additional information can be added to the user account without the user manually entering information, by the program automatically importing information from third party programs 40 (i.e. Facebook API, Twitter API, etc.) with their provided third party login information.

Figure 6:
FIG. 6 illustrates an embodiment of a user account profile for the invention as a mobile phone application.

FIG. 6 is an illustration of an embodiment of a user account profile for the invention as a mobile phone application. As stated earlier, the provided figures of the invention as a mobile phone application are for illustrative purposes only and do no limit this invention to a mobile phone application. The user portable electronic device 20 in this illustration is shown as a smartphone 600. On the screen of the smartphone 600 is a profile for a user account with the menu bar allowing the user to further request information related to the users account. "My Profile" 605 is currently selected from the menu showing information in regards to the user's profile. The other selections from the menu are "My Asks" 610 and "My Replies" 615. "My Asks" 610, not chosen from the menu and not shown in this illustration, is a list of all the calls for media that the user has created which is provided with information from the user database 80 from User Calls 124 for the relevant user. "My Replies" 615, also not chosen from the menu and not shown in this illustration, is a list of all the replies to calls for media that the user has submitted which is provided with information from the user database 80 from User Media Replies 126 for the relevant user.

Within "My Profile" 605 a portion of the user's profile information 620 is shown, such as the user profile picture, provided with information from the user database 80 from User Detail Information 132 for the relevant user. Also under "My Profile" 605, "29 users are interested in my public activity" 625 is stated, showing a number of users that have subscribed to this user which can be found through searching other user accounts within the user database 80 within Subscription Information 134 for all users that are subscribed to this user. In addition, the statement "Linked to Facebook Profile: BRIAN.WILLIAMS142" is shown which means that the related account has been established for this profile and provided with information from the user database 80 from Related Accounts 122 for the relevant user. Third party programs 40 can be used with the related account information to pull more user information or media from a third party account or push information (i.e. user activity, media, etc.) to a third party account. Also "Visa ending in 3488" 635 is shown provided with information from the user database 80 from Payment Information 120 for the relevant user. Next to 635 there is "Purchase History" 640 which is a link to more information concerning goods or services purchased provided with information from the user database 80 from User Detail Information 132 for the relevant user.

Under "Achievements" 645, there is a list of achievements that the user can unlock by accomplishing different tasks provided with information from the user database 80 from Achievement Information 140 for the relevant user. An achievement that is locked is "First Responder" 650. This achievement becomes unlocked if the user is the first to reply with media to a call for media. An achievement that is unlocked is "Gold Medal" 655, as the user has accomplished sending a call for media in regards to a sporting event. As there could be multiple unlocked achievements, there is a summary of achievements that can be presented next to the user whenever a shorter summary presentation of user information is required. A smaller summary list of three achievements is shown as 660 and the user can change the achievements that are presented in the shorter summary presentation of a user account.

As a call for media can contain a variety of information, users can be presented with different options that allow for easier user creation of calls for media instead of manually entering all necessary information. Due to the amount of information needed for each call for media, users can be presented with options such as possible people, locations, events, etc. to choose from. The presentation of options (i.e. people, locations, events, etc.) to users can also enhance user experience by allowing a narrowing down of possibilities for users to choose from. Presenting options to create a call for media can also help explain the usage of the invention by guiding the user through a selection process for each option. In addition, a presentation of possibilities can further entice users to create calls for media. The possible calls for media that is presented to a user can be based upon location, past history of the user, user interests/preferences, and subscription information.

Figure 7:
FIG. 7 illustrates an embodiment of options to create a call for media for the invention as a mobile phone application.

A possible presentation of the invention is to give the user one or more of the following options to create a request for media shown in FIG. 7. A mobile application is shown in FIG. 7 presented on a smart phone 700. When a user is interested in creating a call for media, the exclamation mark button 705 is touched to then display the following options: Direct 710, Event 715, Location 720, and Custom 725. Direct 710 is also called the "friends option", which would allow the user to call or see live or recorded media from users they have relationships with. Users may want to see where friends, family, co-workers, etc. are and what is going on around them. The term friends is a generic holding term that could directly contain or contain subcategories of friends, family, co-workers, and other individuals or groups that have a connection to the user. Users can search for other users via contact information such as name, phone number, email address, etc. Pre-existing relationships can be automatically pulled from phone lists within smartphones or even from existing social networks such as Facebook (as mentioned in the Full Registration process) and added to the relevant user's Contact List Information 118 from FIG. 3. Users can also invite individuals they know to join so that they can easily request media from each other. Calls for media can be made to single users or multiple users. Users can be put into different groups for easier creation of calls so groups can be quickly selected instead of selecting individuals to send calls to. The calls for media can be made publicly or privately, allowing other users to see whom a user has made a call for media to and who is receiving a call. The calls for media for friends could be based upon a recurring time, for instance a user could see what his/her friends are doing every Friday at 7 PM. Calls for media can be set on certain days such as birthdays or Christmas to request media on a certain day from other friends. In addition to time, direct calls for media could be based upon a certain location, such as every time a friend is at a location a call is sent to them for media.

The next presented option to create a call for media is Event 715, this option allows the user to make a call for media for an event. Users can either join existing events or create events themselves. While any call of media is associated with an event (defined as an occurrence or happening), the option Event 715, is an event that is related to a set time. The event also usually has a defined location such as sports event, disaster, festival, concert, etc. The Event option allows users to capture media at certain times and send out notifications before, during, or after the event. For instance, a user can setup a call for media through the event option to capture media at a wedding they will attend in the future. An alert will be sent to all the users that will attend the wedding to capture media and the media can be saved under a user created title such as "Mark's Wedding". All calls for media can be public or private and can allow comments or not. For instance, for "Mark's Wedding" a private call for media can be made just to family at the wedding or a public call for media can be made to everyone that is attending the wedding. If multiple users capture media throughout an event, the media can be played back when it was captured to create multiple perspectives of a single event. There can also be official responders for any call for media, such as for the wedding there could be a professional camera and microphone utilized to capture media for the event. When a request is made to experience the media from the event, the feed from the official responders, the professional camera and microphone, automatically is presented to the user or is the first media option for the user to choose from. Notifications can be sent throughout the event, such as "more video of the bride is needed" or "the official responders are not recording at this moment" that can affect the direction, amount, etc. of captured media.

The third presented call for media option is Location 720, the location option would allow the user to create a call for any live or recorded media from a specific location. Locations can be very specific such as longitude or latitude coordinates or names of establishments such as restaurants, bars, schools, etc. These specific location requests can send a call for media currently to users at the location or send a call for media for previously captured media or media that will be captured. It is possible for multiple locations to be returned when the name of an establishment is used such as McDonalds, which has multiple franchise locations. Multiple locations can be presented to the user as choices, with the order of multiple locations being determined by factors such as distance to where the user currently is, past locations that they user has been interested in, etc. Various location options can be presented to a user such as venues indicated on a map or the user can create a location such as a point on a map or a virtual location in a video game.

The fourth option presented is Custom 725, which is a customized user creation for a call for media. Users can manually select call options such as call title, media restrictions, call receivers, etc. and see past customized calls to base new calls for media on.

Each of these four options to create a call for media can also have media restrictions that are tailored to each option. Media restrictions are the media constraints stated by the call for media that do not be allow certain media to be automatically accepted as part of media replies to a call for media. There can be different media restrictions that correspond to each presented option, such as the Direct option could emphasize on user media restrictions, if a media reply is accepted based upon who submitted the media. The Location option could emphasize on the location of captured media and the Event option could emphasize on time of captured media. Each of these media restrictions are discussed in greater detail herein, however a benefit of this invention is the convenience of receiving desired media which is further facilitated by the call for media options given to users.

While there are four presented options in FIG. 7, this is done for illustration purposes only and does not limit the invention to only these four presentable options to create a call for media. In addition, these four options to create a call for media can be mixed together to create further refined searches. For instance, a user can request media from all friends within a specific location or find events within a local distance around from a user. This information can be obtained through APIs (Application Programming Interface) such as utilizing Foursquare API, Facebook API, or through other geolocation technology. The system can help the user create calls for media by gathering data from social network profiles, current location, or user patterns. The system could automatically choose media that the user might be interested in and alert the user or even create calls for media for the user automatically. An entire social network can be established based upon this system of requesting and sharing media that can create new options to create calls for media. The ability to request media from others and share media can be the adhesive that brings together a community of users to build a social network. Similar to other social networks, users can follow other users or recommend specific users to capture media at an event or location. In addition, media requests and captured media can be identifiable characteristics of a social network, with users being able to see what specific users are interested in seeing and what other users have captured for media. Requests for media can be made for specific types of media such as for just past pictures or just live video with the media replies automatically filtering for the specific requested media.

Figure 8:
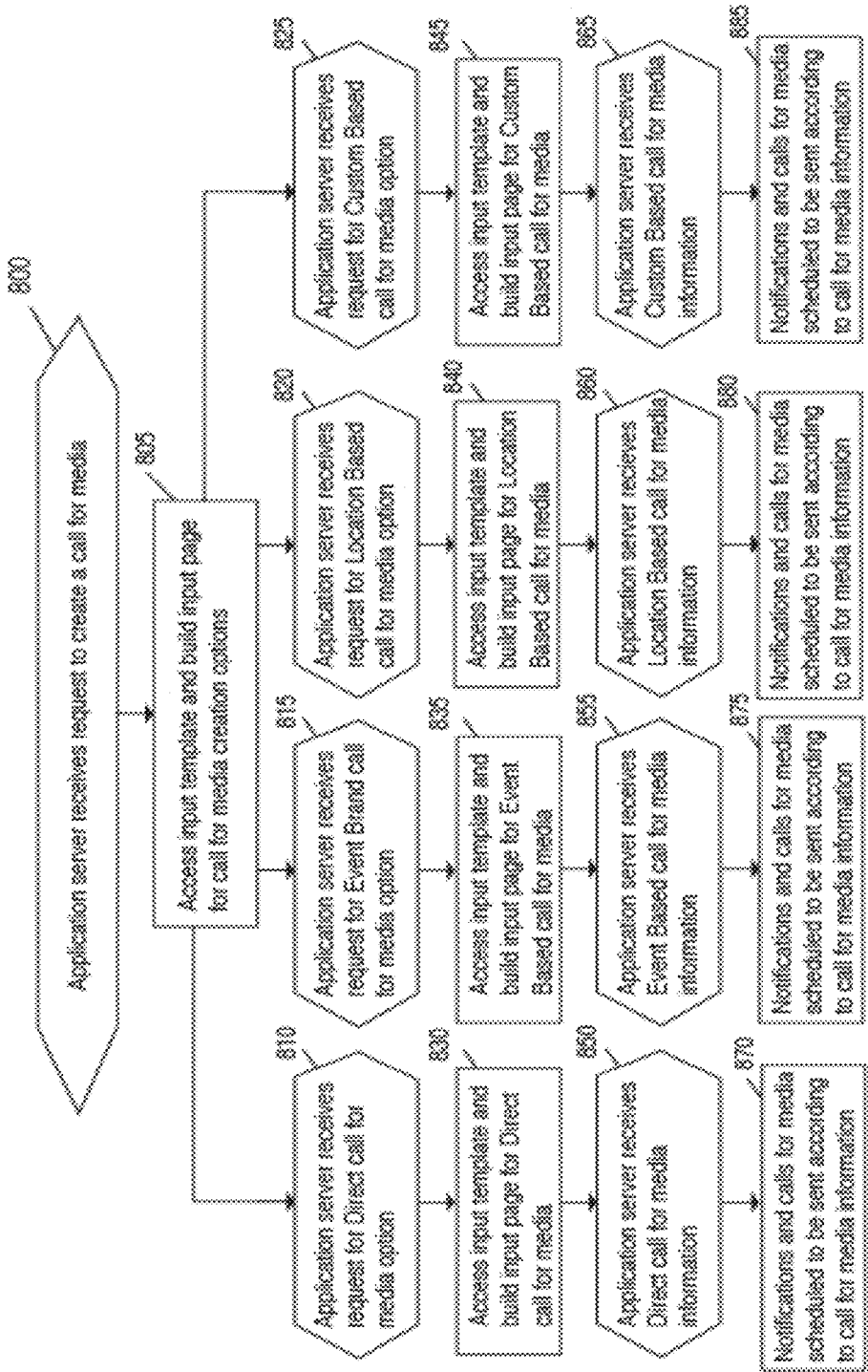
FIG. 8 illustrates an embodiment of a program flow implemented on the server to create a call for media in accordance with the invention.

The above call for media creation process is further elaborated in FIG. 8, where the Application server receives the request to create a call for media as shown in Block 800. The Application server then builds the input page for the call for media choices shown in Block 805. The application server can receive one of the four requests for call for media creation: Direct 810, Event 815, Location 820, and Custom 825. Each one of these four requests for call for media creation is focused on a particular aspect of a call for media and each has its own access input template for easier call for media creation. Access input template and build input page for a direct call for media 830 is focused on calls for media to specific contacts. In all the call for media creation options, there are two types of calls for media that can be made: public or private. Public calls can be based upon location, where all users that are typically within a geographic distance of the event or location will be notified that a call for media has been issued. Public calls are open calls to retrieve media from all users near or at an event location. Media responses to a public call can be public or private, in other words the media response for the call can either be shown to everyone or just to the caller. Public calls can also be made based upon time, as certain events may not have a specific geographic location. For instance, users can record media from an online event that does not have a real world geographic location. As public calls are made to the general public, private calls are direct requests for media to specific users or user groups. For instance, a user can privately request media from a friend at a party and no other users will be able to see the request for media. Private calls can be defaulted to have private media replies, however it is possible to have public media replies to a private call. Anonymous calls can also occur where the request for media is made, however the caller's information is hidden. Anonymous calls can be made both privately and publicly, however all these various call types (public, private, anonymous, etc.) do not all have to offered. It may be important to distinguish between private calls and anonymous calls, with a private call for media being only sent to selected users or groups, while an anonymous request for media may be sent to any user with the caller information being hidden from receiving users, for example, depending upon a particular implementation. There can also be anonymous replies to calls for media, where the user that submits media is not revealed.

It is possible that users can send both private and anonymous public requests for media, for instance a user can send a private call for media to users that are in their cell phone contact list and for all other users that receive the call for media, the call for media will be seen as anonymous. Private calls can be made directly to another user or to a group of users. For instance, at a concert a user may want a private experience with only people that the user knows as opposed to joining a public call with all users attending the concert. A private call can be made to a select group of individuals to share media captured at an event for a more intimate experience. This captured media can be made private to only participating users or shared with specific users. While it is possible to pull out media captured by specific users from a public call, it may be more convenient or intimate to create the private call for media. Private call lists or specific calls themselves can automatically create private calls for events or locations based upon keywords or tags that are associated with an event, locations, or geographic proximity. For instance, a private call list can have users that will always be part of a private call whenever they are included in a call for media. All media from that user will show up as private, while the media obtained from everyone else will be public.

An example of a keyword trigger for a private call is a user that has the word "concert" as a set keyword to request media from any friend that attends an event with this keyword. The friend will receive an automatic private call to capture media of the concert when the friend attends a concert. A user could desire just to see all friends that are attending concerts and choose to make a call or not. A private call list can be created for concerts, and whenever a friend is attending a concert the user can see that a friend is attending a concert. There can be multiple friends attending multiple concerts, so the organization or further refinement of these lists can be done via the characteristic of the friend (such as family member, college buddy, over 18, etc.) or via the characteristic of the concert (name of concert, location of venue, type of concert, etc.). The private call list or automatic call can be made also when friends of users arrive at certain locations such as cities, restaurants, etc. Also private call lists or automatic calls can occur when a certain geographic distance from a location, user, or event. An automatic private call can be made to specifically chosen people in the user's call list when an event occurs or the system can automatically populate a private call list for the user based upon users own personal contact lists cross referenced with users at an event, locations, or geographic proximity. The private call list can automatically expand in the future when more users join an event, enter into a geographic location, or become a set distance from a user. When a private call is initiated, a group is formed and all selected individuals can reply with media that is immediately seen only within the group. It is possible that the caller can setup the private call so that only he/she can see the media responses sent by other users or can choose which media replies the rest of the group sees. Other users in the group can possibly see the current settings of each private group that they are participating in to see whether they want to participate in the private call or not. It is also possible for the call to be private until triggered public; such as the media response can be made public if there is a corresponding public call for media at that event or location.

Each call setting may be tailored so call creation is easier for a user. Private events are different than private calls, a private event is an event that is only seen by a selected set of members. Within the private event there can be multiple calls for media at different times and locations, for instance if there is a high school prom private event, there could be a call for media for the prom football game and a call for media for the prom dance which would occur at different times and different locations. As private calls are generally more personal then public calls, different alerts can be given to the user when a call is received for private calls, public calls, specific users, anonymous, etc. Block 830 then builds an input page that is focused on creating direct calls by presenting recently made private calls, presenting a list of contacts from the user's account or related accounts, and other information that is focused around a direct call experience. After block 830, the application server receives the direct call for media information 850 and waits until the time is reached to send out notifications or actual call for media for the direct call for media 870.

An alternative choice from Block 805 is a call for media that is based around events, which when block 815 occurs, block 835 then accesses input template and builds the input page for an event based call for media. The event based call for media is focused around both private and public events has a set time of occurrence and usually a location where the event will occur. In order to facilitate event based call for media creation, events can be automatically pulled from user's calendars, schedules, social networks, etc. to easily be used for media viewing or requests. Events can also be pulled via API's from other existing platforms or databases such as Eventbrite to further expand event choices. Calls for media can be scheduled for future events or can be requests for media from present or past events. Events do not have to be location specific, for instance the event can be for users around the world to participate in capturing New Years Eve. Events can have virtual locations, such as events can occur virtually such as an online game World of Warcraft or at a specific time when using any program or application.

If an event needs to be created, an event can be created by selecting from offered popular event types such as a concert, wedding, birthday, etc. Further details can be added such as location, date, individuals to request media from, etc. Calls for media, especially events, can be created within a few steps such as a one touch button system that automatically creates a call for media based upon current location and time. Or instantly if a user starts capturing media at a location and by submitting media the associated information from the media (location and time) creates a call for media based upon the information obtained with/from the media. Events that are instantly created are still identifiable as location or time can be used to identify the event. Events can also be private or public and be created anonymously or show information of the event creator. After block 835, the application server receives the event based call for media information 855 and waits until the time is reached to send out notifications or call for media for the event based call for media 875.

Another choice from Block 805 is a location-based call for media, shown in block 820, which then leads to block 840. The input page for a location based call for media is focused around a location. The location-based call for media is for a user that wants to experience live or recorded media from a specific location. A user is able to see previous locations that they have requested or viewed media from or enter in a new location that they would like to request or view media from. Locations can be presented in a map format with the location being the center of the map and all users within the location or surrounding the location shown on the map. The map can also be utilized to see where current or past media was captured on the map. Information on the map can be filtered such as seeing only friends on a map or where live media is currently being captured. Maps can be extensive and cover wide distances such as for countries or cities or extremely specific such as for buildings or concert venue layouts. It is possible that maps have depth such as the users electronic device can measure altitude to determine height location within a building or outside. In addition, an event could be mobile and constantly moving (i.e. person, parade, etc.) and the moving location could be represented on a map as well. Users can capture the same event but in different locations to add to a call for media. Locations can also be pulled via API's from other existing platforms or databases such as Yelp to further expand location choices. Calls for media can be based upon location, where any user that enters a location will automatically receive a call for media. After block 840, the application server receives the location based call for media information 860 and waits until the time is reached to send out notifications or call for media for the location based call for media 880.

The last choice from Block 805 is a custom based call for media, which is block 825, that leads to block 845 that accesses input template and builds input page for a custom based call for media. The custom option to create a call for media enables the creation of a call that is personalized to specific details. Users that either want to have more control over a call or like to have their calls setup in a particular fashion can prefer this option. Possible users that may frequent this option are businesses, event coordinators, etc. Previously created or drafted custom calls can be shown along with many of the call details from a call such as Call Schedule, Cutoff Time, Call Info, etc. While each of the four call for media options has a different presentation of information, it is possible for the same call for media to be made across all these options. For the custom option, any type of call for media can be created and so the focus of presentation is the ability for users to control the details for a call for media. For example, the call schedule and cutoff time can be manipulated to send out notifications and calls for media at specific times. Whether a private or public call is made, there can be time limits to respond to a call.

There are many types of time limits and time settings such as setting when a call for media will end or preventing media replies after a certain period. For instance, if a call is made from Los Angeles at 4 PM PST to see what is going on at a factory in Bejing, China, the call can have a time restriction of 2 hours before expiring. The user in Los Angeles only has use of the media reply before the Los Angeles office closes a 6 PM PST. Notifications for the call can also be drastically altered, such as alerting users in a private call every 5 minutes for the next hour that a call is occurring or will occur. Or sending out a notification at a specific moment during an event while the call for media is occurring so that users focus capturing media on a specific subject at the event. The call schedule and cutoff time is different than the media restriction of time. The media restriction of time is a window(s) of time that media from an event will be allowed. The time the media that was captured must fit within the set window of time to be accepted as a media reply for an event or location. For instance, if a video was captured at the end of a Broadway musical show, and the window of time for captured media was set for the beginning to the middle of the show, the media would not be accepted as a reply to the call for media. Although the media is for the same event, it will not be accepted as a reply to the call for media as it is footage from the end of the show as opposed to the beginning or the middle. The custom option can list all the media restrictions that can be added to a call for media so that the user can choose the settings for each desired media restriction. After block 845, the application server receives the custom based call for media information 865 and waits until the time is reached to send out notifications or call for media for the custom based call for media 885.

Figure 9:
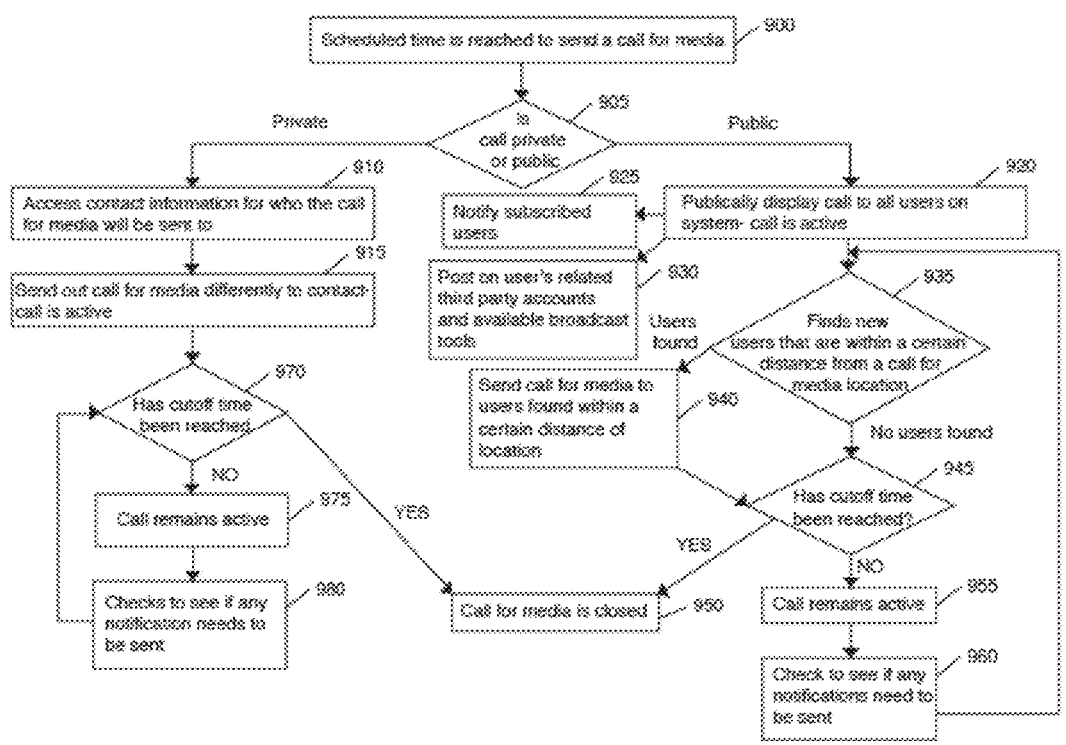
FIG. 9 illustrates an embodiment of a program flow implemented on the server to send a call for media in accordance with the invention.

FIG. 9 illustrates the program logic implemented in the application server 60 and the database interface 65 to send out a call for media. In block 900, the scheduled time is reached to send a call for media. The call for media could be sent immediately after the call for media is created, as the user may want to receive media urgently. When the time to send the call is reached, it is determined whether the call for media is public or private 905, this is found through the public/private status setting in call for media database 85 in the relevant Call Info 218 field. If the call for media is private then at block 910 the application server 60 accesses the contact information for whom the call for media will be sent to by looking at the relevant Call Receivers 222 field in the call for media database 85. The call for media is then send out to all the contacts through their contact information at block 915 and the call for media's relevant Call Info 218 field is updated to active. If at block 905, the call for media is public then block 920 occurs where the call for media is publicly displayed to all users. The call for media is then sent to any user that has subscribed to the location, keyword within the call for media, or the user that sent the call at block 925. The call for media is also broadcast to the public through non-direct forms of communication such as billboards, broadcast (i.e. radio, television, etc.), advertisements, bulletins, websites, or through other program and APIs at block 930. Even though a user may not be physically at the location, a user may know someone currently at the location, further propagate the call for media, have access to a media capture device at the location, or plan to be at a location at a future time.

In addition, Block 920 updates the call for media's relevant Call Info 218 field to active. Block 920 leads to block 925, where all users that have either subscribed to the user, location, or any keyword that might be associated with this public call for media are notified by comparing the information from the call for media with user Subscription Information 134 from user database 80. Block 920 also leads to block 930 where the public call for media is post on the caller's related third party accounts such as a Facebook and Tumblr account, obtained through relevant user information from Related accounts 122 from user database 80. The invention may offer available broadcast tools such as a Twitter® account that is set up to announce all public calls for media through third party programs 40 that are connected to the network 10.

In addition, block 920 leads to block 935, which find users that are within a certain distance from the call for media location. The location of users can be found in real time by pinging users that are around a location, accessing social media information to see if the user is or has been around a location, or by checking user database 80 in Location Information 138 to see where users are or where they have historically been to see if they are around a location. Location Information 138 can be obtained through APIs (Application Programming Interface) such as utilizing Foursquare® API, Facebook® API, or through other geolocation technology from the user's electronic devices (GPS, distance from other electronic devices, etc.). The system can assess possible user location to store in Location Information 138 by gathering data from social network profiles, current location, or user patterns. If any users are found within the certain distance of a location, then block 940 occurs where the call for media is sent to these users that are within a certain distance of a location. The location of the event is found in the relevant record from the call for media database 85 in Event Information 216 and the certain distance from the call for media location is found in the call for media database 85 in Media Restriction 224.

Users can be contacted through one or multiple ways from information obtained in their user record 80a, b, . . . or n in the field User Contact Information 116, for example a push message could be sent to their cell phone and an email could appear on their laptop notifying them of a call for media. If no users are found within a certain distance from the call for media location from block 935, then block 945 occurs and checks whether the cutoff time for the call has been reached. Also if users have been sent the call for media in block 940, then the next block is also 945. The cutoff time is accessed through the call for media database 85 in Cutoff Time 232 and compared against the current time. If the cutoff time to end the call for media has been reached, then block 950 occurs and the call for media is closed. If the cutoff time is not reached, then the call for media remains opened in block 955 and passes to block 960 where the application server checks to see if any notifications need to be sent in regards to the call for media. Once this is completed, the process loops back to block 935 and checks again to see if any new users are within a certain distance of the call for media location. The process continues until the cutoff time is reached 945 and the call is closed 950. A similar loop occurs for the private call after block 915, where at block 970 the cutoff time is determined to be reached or not. If not, then the call remains active 975 and the application server checks to see if any notifications need to be sent out 980. The process loops back to 970 to see if the cutoff time has been reached, and when the cutoff time is reached the call for media is closed 950.

The invention may allow the server to proactively create calls for media and send them to users based upon user's location, information, activity, history, interests, or preferences. For instance, a call for media can be created without direct user input and sent to users such as a user enters into a location and automatically receives calls for media for events around them. For instance, by walking down Main Street at Disneyland, a system of the invention can automatically utilize user information and location and create and send a call for media about the Main Street parade, candy stores, restaurants, magic store, and other stores/entertainment occurring on Main Street. A user could then take a picture or text and respond to any of the calls for media through their mobile phone. Users can share calls for media or their replies to calls for media to other specific users. Public calls can be shared, however for private calls it is possible that a majority of the callers, the event administrator, or call creator will need to authorize each piece of media that wants to be shared, acceptable users to share media with, or additional participants to receive the call. In addition, calls for media can automatically be created if a certain amount of users congregate to an area at the same time or are known to all be doing the same activity at the same time. For instance, a call for media can automatically be created and sent to users, who possibly do not even know each other, that happen to be at Central Park Zoo in New York at the same time. A call for media can also be sent to users who are doing similar activities at the same time, for instance users who happen to be at two separate Chinese restaurants for lunch can receive a call for media and they can share their experience eating Chinese food at two separate restaurants.

Figure 10:
FIG. 10 illustrates an embodiment of a presentation of current information to a user of the invention as a mobile phone application.

FIG. 10 is an illustration of a user account profile in an embodiment in which the invention is in part implemented through a mobile phone application. As stated earlier, the referenced figures are for illustrative purposes only and do not limit this invention to a mobile phone application, nor to any particular implementation of a mobile phone application, to the extent such a user interface is provided. The user portable electronic device 20 in this illustration is shown as a smartphone 1000. On the screen of the smartphone 1000 there is a menu of Now 1005, Ask 1010, and Reply 1015. Ask 1010 is not chosen from the menu and therefore not shown, but provides information about the calls for media that have been sent to the user. Reply 1015 is also not chosen from the menu and therefore not shown, but provides information about media replies that have been sent to the user.

Now 1005 is chosen from the menu and provides the most recent information related to the user. Presented are two private calls for media displayed along with media replies to the public call for media that was created by this user. 1020 shows the name and picture of the user that has replied to the call for media sent by this user from call for media database 85 from Media Replies 226. 1025 shows the reply was made "7 minutes ago in Westchester, Calif." also from call for media database 85 from Media Replies 226. 1030 is the title of the call for media from call for media database 85 from Title of Call for Media 212. 1035 is a preview for a media reply from call for media database 85 from Media Replies 226 and 1050 shows that there is another media reply that has been made to this call for media. 1040 and 1045 shows the options "like", "comment", "share", along with options represented as a "thumbs up" and a "dialog box", this information can be associated with call for media database 85 from User Feedback to Replies 230 and directly link to third party programs 40 to post on user's third party accounts. 1055 is a call for media made by user "Sean Bryant", from call for media database 85 from Call Info 218, to a group "team wool" that this user is part of from call for media database 85 from Call Receivers 222. 1060 and 1065 shows the options "like" and "comment" along with options represented as a "thumbs up" and a "dialog box", this information can be associated with call for media database 85 from User Feedback to Calls 228 and directly link to third party programs 40 to post on user's third party accounts. Unlike 1040, the term "share" is removed as this call for media is private and not be shared with others outside of "team wool". 1070 is a "reply" function that allows this user to reply with media to this call for media.

Figure 11:
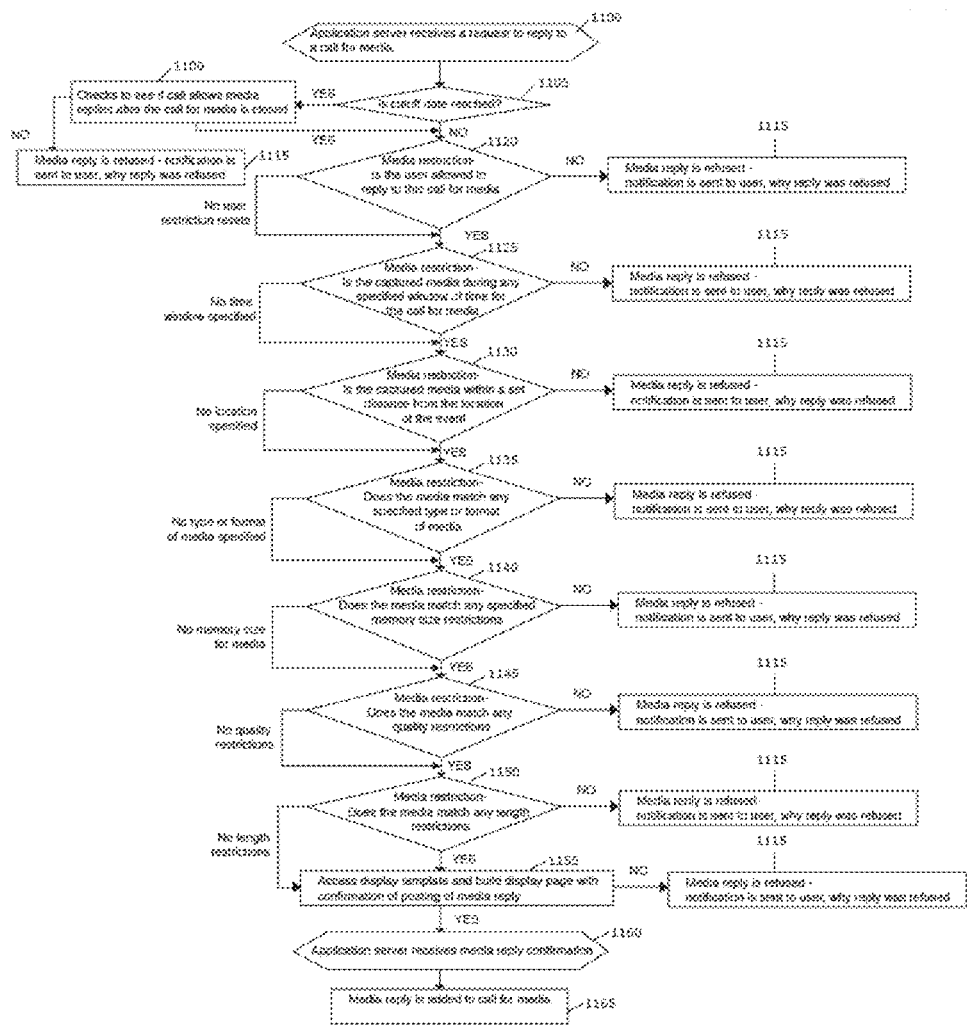
FIG. 11 illustrates an embodiment of a program flow implemented on the server to receive a media reply to a call for media in accordance with the invention.

FIG. 11 illustrates the program logic implemented in the application server 60 and the database interface 65 to receive a media reply. In block 1110 the application server receive a request to reply to a call for media, the request to reply to a call for media can contain the media itself and information about the media including the user that has requested to reply with media, media tags, associated media information, etc. The first step is to determine whether the cutoff date has been reached for a call for media at 1105 from the relevant record from the call for media database 85 in Cutoff Time 232. If the cutoff date has not occurred, then the call for media is still active and the next step is block 1120. If the cutoff date has occurred, then the call for media is checked to see if media replies are allowed after the call for media is closed 1110, which is accessed in the call for media database 85 from Media Restriction 224.

If media replies are not allowed, then the request to reply with media is refused, and a notification is sent to the user on why the media reply was refused 1115. If media replies are allowed after the cutoff date, block 1120 checks Media Restriction 224 to see whether the user is allowed to reply to this call for media. User restrictions can exist due to the type of account a user has or the status of the user's account. Even though a public call may be made to all users, not all users will be notified to respond or even allowed to respond. There can be bad responders that are consistently replying with unrelated media or explicit media that will be blacklisted from responding to all public requests. There can also be users that abuse the system in various other ways such as setting up fake events or pretending to be other users that will also cause them to be kicked off the system or blacklisted from public or private responses. If the user that is submitting the request to reply to a call for media does not meet the user restrictions (i.e. blacklisted users, basic registration users, etc.) then the request to reply with media is refused, and a notification is sent to the user on why the media reply was refused 1115.

If no user restrictions exist or if the user is not restricted to replying with media, then block 1125 occurs. Block 1125 checks against the media restriction of any specified window of time the media reply needs to be within. The call for media can require that media must be within a specific time period found within database 85 from Media Restriction 224. Media must be captured within certain windows of time in order to be allowed as a reply to a call. As long as the media can be verified via a time stamp, metadata, or other tags and associated information, then the media can be allowed as a reply to the call for media. For instance if a photograph has a time stamp to prove that it was taken within the window of time, then the request would continue to block 1130. Also if there is no media restriction in regards to the time when media was captured, then the request can continue to block 1130. If the media is outside the window of time allowed for the media, then the request to reply with media is refused, and a notification is sent to the user on why the media reply was refused 1115.

Block 1130 checks whether the media was captured within a set distance from a location of the event. The call for media can require that media must be within a certain distance of an event location, this distance is found within relevant record found in call for media database 85 from Media Restriction 224 and is utilized with the relevant event location found in Event Info 216. As long as the media can be verified to be within a certain distance from an event location via a location stamp, metadata, or other tags and associated information, then the media can be allowed as a reply to the call for media. There could be multiple locations for a call for media and each of these events can have their own set allowed distance. Included within the associated information for media can be information provided by the application or user electronic device that can be used in the media restriction process.

Both the application and user electronic device can provide information to verify whether media passes certain restrictions or not without relying upon information from the media itself. For example, an electronic device can associate captured media to a time or location without the time or location information being directly placed next to or embedded within the media. If no media restriction is set based upon location or if the media is captured within the set distance around the event location, then block 1135 occurs. If the media reply is outside the set distance from the event location allowed for the media, then the request to reply with media is refused, and a notification is sent to the user on why the media reply was refused 1115.

Block 1135 checks the media reply against the media restriction for any specified media type or format. For example, the call for media can restrict users to only allowing text and audio and no pictures or video, thereby limiting media replies to text and audio. If a request to reply with media is submitted and the media is any restricted media type, then the media reply will be refused and a notification will be sent to the user of why the media reply was refused 1115. The call for media can also restrict the format of media, for example within audio media MP3 files may be acceptable, however WAV files are restricted. Therefore any restricted formats or types found in the relevant record from the call for media database 85 from Media Restriction 224 will also be refused as in block 1115.

If no type or format of media is restricted or if the media passes the restrictions set for type of format of media, then block 1140 occurs. Block 1140 checks against any memory size restrictions set for media replies. The call for media can require the amount of memory used for media set to a minimum size, maximum size, between sizes, or an exact size. Media memory restrictions are found within the relevant record in the call for media database 85 from Media Restriction 224. As long as the media can be verified via size calculation, metadata, or other tags and associated information, then the media can be allowed as a reply to the call for media. For example, a user may only be able to experience limited media files due the limited data plan that they have or poor network connection. When this user sets up a call for media, a media restriction can be established that no media is allowed over 1 MB in size so that the user can receive smaller media reply files.

If no media restriction is set based upon memory size for media or if the media passes any memory size restrictions, then block 1145 occurs. If the memory size for media does not fit media restrictions, the reply will be refused and a notification will be sent to the user of why the media reply was refused 1115. Block 1145 checks against any quality restrictions set for media replies. Media quality restrictions are found within the relevant record in the call for media database 85 from Media Restriction 224. Quality restrictions can be found by analyzing the media itself, analyzing the connection of devices to the network, or through analyzing the associated information with media. Analyzing the media itself can be done via programs checking quality of media such as image stabilization, pixilation for visual media, sound clarity, volume for audio, etc. If the media quality does not fit media restrictions, the reply will be refused and a notification will be sent to the user of why the media reply was refused 1115.

If there are no quality restrictions established or if the media passes any quality restrictions then block 1150 occurs. Block 1150 check against any media length restrictions found within the relevant record in the call for media database 85 from Media Restriction 224. Media length restrictions are for media replies that represent more than one moment in time, such as video and audio, where duration of the media is the media restriction. For instance, a call for media could have a maximum length of 8 seconds for each media reply or another call for media could have a minimum length of 10 minutes for audio. If the length of media does not fit media restrictions, the reply will be refused and a notification will be sent to the user of why the media reply was refused 1115.

If there are no media restrictions on the length of media or if the media passes any length restrictions, block 1155 occurs. Block 1155 accesses the display template and builds a display page with confirmation of posting the media reply. If the media reply is confirmed, the application server receives the media reply confirmation 1160 and the media reply is associated with the call for media 1165 and the relevant record in the call for media database 85 for Media Replies 226 is updated. If block 1155 the confirmation to post the media reply is denied, the reply will be refused and a notification will be sent to the user of why the media reply was refused 1115.

While FIG. 11 illustrates a linear logic progression for allowing media replies to become associated with calls for media, the media restrictions can occur in any order, in addition there are combination of media restrictions that can also occur along with additional restrictions. It is possible for a program or electronic device to automatically reformat media replies to fit the requirements for a call for media. For instance, if a media restriction exists requiring media replies to be ten seconds in length and a 5-minute video clip is submitted as a media reply. The 5 minute clip could automatically be reduced to 10 seconds and then be used a possible media reply so that it fits the media length restriction. Media replies that are denied due to a media restriction can be held within Media Authorization 236. If media replies need to be manually confirmed before being associated with a call for media, the media replies can also be held within Media Authorization 236 before being either confirmed or denied as media replies to a call. Media replies that are held within Media Authorization can show as a media reply within the account that posted the media reply, but no other account sees the media reply until it becomes authorized. As FIG. 11 contains multiple media restrictions, it is possible to remove media restriction blocks/steps if certain media restrictions are not offered.

Figure 12:
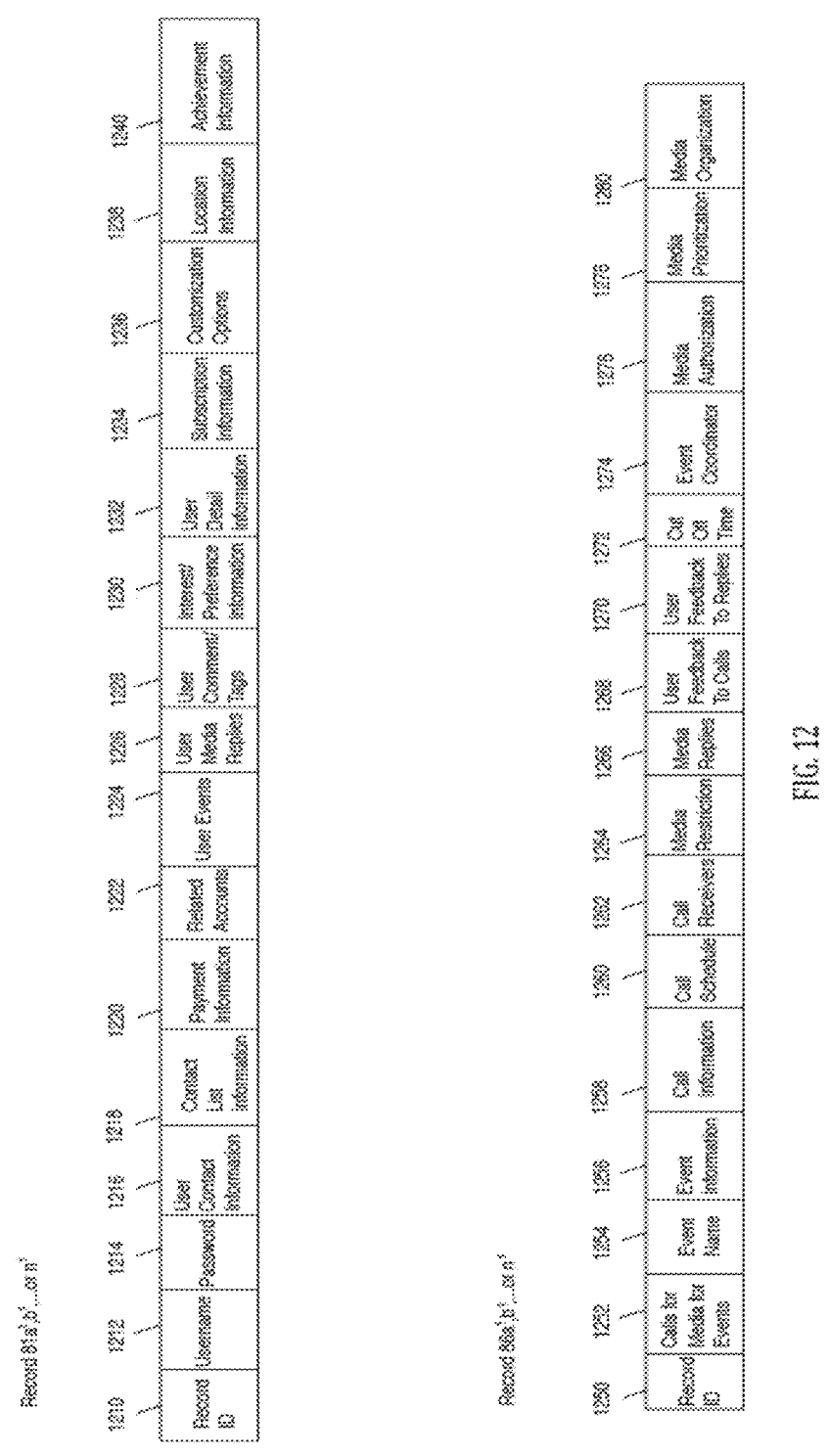

FIG. 12 is an example of an embodiment of how the creation of an event database would also be able to accomplish similar tasks of the FIG. 3 database. There are multiple reasons why this database would be utilized in certain situations, as when users are making multiple calls for media for the same event, for example, or if there needs to be more control over any call for media made for an event, etc. While a call for media database and event database have different structures, both structures can accomplish the same goal of sending out a call for media and gathering media replies for an event. As explained previously, an event may be associated with a person, location, time, a combination thereof, etc., and any call for media that relates to an event would be part of the relevant event record 1250 in the event database. For example, an event could be recurring such as any Friday night at a specific nightclub, and therefore all calls of media made on Friday night related to the nightclub are now under the event. The modified database structure is presented to show another embodiment of database structure that may be able to achieve the same goals, depending upon a particular implementation. For example, if there were multiple calls for the same event in the call for media database from FIG. 3, each call for media would have its own record. However in the event database from FIG. 12, each event would be its own record and each call for media would be part of each event record.

The call for media for each event would be found in Call for Media 1252. The event could have a master call schedule in Call Schedule 1260 so that the public is not inundated with calls for this event and public calls are sent out at predetermined times, e.g. every ten minutes or other suitable interval, or in accordance with other criteria, instead of all at once. There could be minimum, maximum, or exact media restrictions set in Media Restrictions 1264 for all calls made for the event. While many field names remain the same between the call for media database and the event database, the event database is structured around events instead of calls for media and the fields now represent the event instead of specific calls. For example, Media Replies 1266 may contain replies for the entire event instead of replies for specific calls, however the information in each field contains the related call information to know to which call the information in each field relates.

The program logic may also need to change to accomplish the creation of a call for media and reply to a call for media, however the overall concept and understanding through provided illustrations and descriptions should allow someone having ordinary skill in the field of the art to understand how this would be achieved without additional explanation.

FIG. 12 provides an alternate implementation of the fields in the user records $81a^1, b^1, \ldots n^1$, which may include:

Record ID 1210: Provides a unique identifier generated by the database interface 65 for each unique user.

Username 1212: Provides a unique username that the user uses to access the member only information.

Password 1214: Provides a secret password created by the user used in conjunction with the username in order to access user information and other member only information.

User Contact Information 1216: Provides an email address of user, phone number, address, chat id, and other contact information.

Contact List Information 1218: Comprises of one or more sub-fields that contain the contacts and contact information either submitted by the user or imported from existing contact lists allowed by the user.

Payment Information 1220: Comprises one or more sub-fields indicating payment information (i.e. Paypal, Bitcoin, credit card info, etc.).

Related accounts 1222: Comprises of one or more sub-fields that contain the username and passwords to other accounts online to be used to present information to users on different systems/platforms or to gather information from.

User Events 1224: One of more sub-fields set by the database interface 65 indicating event information such as events that the user has created, is event coordinator for, or has made a call for.

User Media Replies 1226: One of more sub-fields set by the database interface 65 indicating information about media that the user has submitted.

User Comments/Tags 1228: One or more sub-fields set by the database interface 65 indicating comments that the user has submitted.

Interest/Preference Information 1230: One or more sub-fields set by database interface 65 providing history about the user including preferred media, events, etc and the interests and preferences listed by the user during the Full Registration Process or assumed by the system through user activity.

User Detail Information 1232: One or more subfields indicating whether the user has account restrictions, type of user (i.e. individual, group, business, entity, etc.), profile details, name, address, any products/services for sale, purchase history, bank information, etc.

Subscription Information 1234: Comprises of one or more sub-fields that contain the location/area, Username, Event, or keyword that the user would like to receive information on.

Customization options 1236: Comprises one or more sub-fields recording customization options on creating calls for media or viewing media for an event Location Information 1238: One or more subfields set by database interface 65 providing information regarding the users current and past location.

Achievement Information 1240: One or more subfields set by database interface 65 providing information regarding the users locked and unlocked achievements.

FIG. 12 also illustrates an exemplary implementation of the fields in the call for media records $86a^1, b^1, \ldots n^1$, which include:

Record ID 1250: Provides a unique/identifier generated by the database interface 65 for each event.

Calls for Media for Event 1252: Provides information in regards to each call for media made for the event.

Event Name 1254: Provides an identifier name for the even the call for media is in regards to.

Event Info 1256: Provides information about the event such as genre, date, duration, individuals involved, etc.

Call Info 1258: Provides information on a call for media made for the related event record, if call can be public/private, similar calls, any possible offered compensation for media replies, etc.

Call Schedule 1260: Provides information about when a call or notifications about the call will be released for the related event record, and when the call for media expires. Also contains information about who the notifications are for or what content the notifications contain.

Call Receivers 1262: Provides information about who receives the call for media for the related event record. If the call is private then lists the contacts who the call is sent to. If the call is public then list which users in the public receive the call.

Media Restriction 1264: Provides information about any media restrictions set for a call for the related event record.

Media Replies 1266: Provides information on media replies for the related event record such as which user replied with media, when the reply was submitted, where the media can be accessed, etc.

User Feedback to Calls 1268: Provides information about any user feedback to a call for the related event record.

User Feedback to Replies 1270: Provides information about any user feedback to a media reply for the related event record.

Cutoff Time 1272: Provides the preset time when the call for media expires for the related event record.

Event Coordinator 1274: Provides information about the event coordinator for the event and any restrictions or content that the event coordinator wants the user to experience for an event.

Media Authorization 1276: Provides media or location of media that is waiting to be allowed to be a reply to a call for media or media that has been turned down as a reply to media for the related event record.

Media Prioritization 1278: Provides the prioritization of media that is displayed when a user wants to experience media from an event or call for media.

Media Organization 1280: Provides information about media playlists that the server or user has created for an event or call for media.

Figure 13:
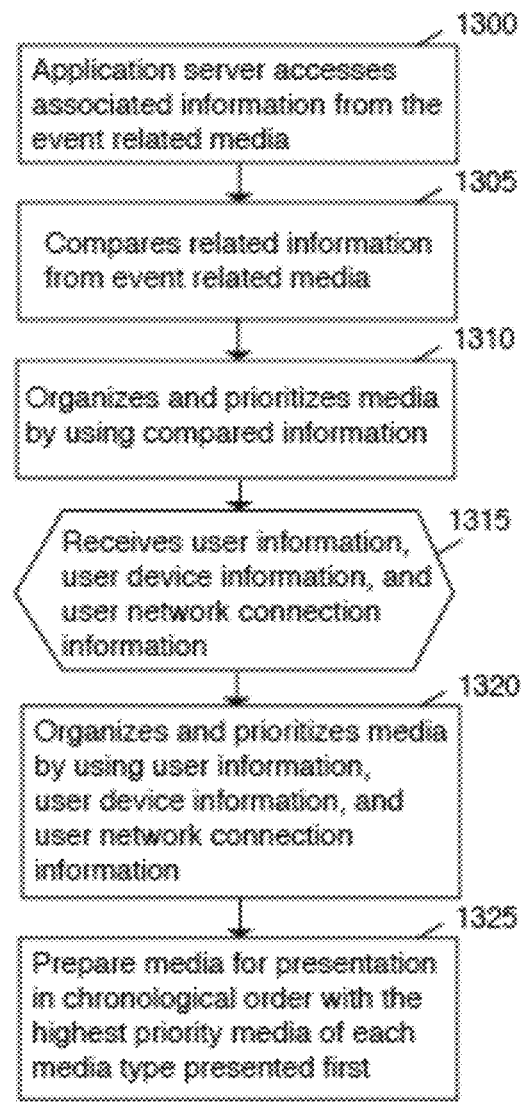
FIG. 13 illustrates an embodiment of a program flow implemented on the server to organize and prioritize event related media in accordance with the invention.

FIG. 13 illustrates an embodiment of program logic implemented in the application server 60 and the database interface 65 to organize and prioritize media for presentation purposes. This program logic can occur for any event related media, even for event related media that is not necessarily obtained using the above-mentioned system and method. However for explanation purposes, the above-mentioned system and method will be utilized as it has already been presented. The resulting presentations of event related media from FIG. 13 require event related media to be associated with information that can be organized and prioritized. The associated information does not have to be exact, nor does it have to correspond to other media in a general timeline, however for this method to have an effective presentation of event-related media, it may be advantageous in certain applications to have more associated information regarding the event related media (i.e. time, location, etc.).

FIG. 13 begins with the application server 60 in this embodiment accessing associated information from at least two pieces of event related media 1300. Associated information for media can be found within the media itself such as embedded geolocation, timestamp, image stability, etc., or information related to the media such as user rating, information on user that captured media, device used to capture media, etc. Associated information can be caller(s), call(s), user id of responder(s), media type, comment(s), commenter(s), tag(s), user id of tag creators, titles, genre, location, individuals captured in the media, etc. Associated information can be added before, during, or after the media is captured and can be done via the capturing device, another electronic device (i.e. server, computer, etc.) or an individual/group (i.e. user, company, etc.). Once the associated information has been accessed from each media, block 1305 occurs where the application server compares the related associated information for the event related media.

All retrieved related information can be compared so that a better understanding is obtained of how the media relate to one another. There could be hundreds of pieces of media that are compared against each other or a single piece of media could be compared against media that has already been organized and prioritized. At block 1310 the media is then organized and prioritized by utilizing compared information from all event related media. For instance, two users with smart phones and one user with a cell phone can be at a political debate. One of the smart phone users can be recording live throughout the entire debate, while the other smart phone user records only the first half of the debate but does not upload the footage immediately. The cell phone user only takes pictures and captures live sound from the second half of the debate. The event related media can then be experienced as separate from each user's perspective, chronologically, or mixed together.

FIG. 13 shows the program logic of how event related media is prioritized and organized for presentation purposes. Event related media obtained from a call for media with multiple media restrictions can have a higher chance of having more associated information to compare and therefore have more refined prioritization and organization of media. For instance, if a call for media is made with a media restriction for time, the media can be chronologically organized by looking at the time reference for each piece of media and laid over a master time line or placed within a master time code. This time code can be utilized for every piece of media from tweets to video as long as each piece of media has associated time information. With every piece of media marked along a set time code, media can be played in any order.

It is possible for different types of media to be laid over another and playback in sequential order. For example, in a playback mode a user can view tweets laid over pictures taken at an event in chronological order for tweets and pictures. Also if there are two video recordings taken at the same time from two separate users, and one of the video recordings has great sound while the other has great visuals. The better sound file can be presented with the better visuals as the video and sound from the two separate pieces of media can be synchronized with each other through their related time information. It is possible that the best audio file from the event is from the event coordinator's official microphone, and this sound can be used with any video taken from the event that can be placed within a time code.

The media can be switched in real time, so that users watching a broadcast can see the video a user is taking however will be listening to the audio from the official microphone that the event coordinator has authorized. In addition to pieces of media having different prioritizations, sections of a piece of media can have different prioritizations (ranking), and be exchanged for other pieces of media. For instance the first 10 minutes of video can have a high ranking, while the last 5 minutes has a low ranking and could cause the last 5 minutes to be changed out with higher ranking media.

In addition to time, another detail of associated information with event related media that can be compared is location of captured media. The location of where media is captured can be part of the prioritization and organization of event related media. For instance, the distance from an event or the distance between two pieces of captured media can help determine how the media should be organized and prioritized. For example, media that is captured around the same location such as all within the left side of a stage during a concert would not necessarily bring about the best presentation experience by only showing the perspective from the left stage of a show. The presentation could utilize the best media from the left stage and then switch during the playback of the event to different locations that also had captured the event. This way there could be various perspectives of the event instead of a constant perspective from one side of the stage. In addition the proximity to the event can lead to a higher prioritization, with media closer to the event location ranked higher.

Moreover, event related information can be compared due to user's feedback or interaction with event related media. For example, users can possibly rate all media from an event that is broadcast live or played back from recording. There are multiple factors, that determine whether media has high value or not. A piece of media, whether it is video, text, sound, etc., may have low quality but captures something that is not found in any other piece of media. For instance, a user waving a camera trying to record an event with an object in the way may be hilarious because it is shot in poor quality. Due to the poor quality of media a computer utilizing rules and algorithms to determine its priority rank would rank it low, however users may think it is funny and therefore give the media a high priority rank. This high priority rank can be obtained indirectly via comments, likes, and other media interaction (i.e. tags, number of views, etc.). In addition, a user maybe sitting next to another user which would give the media a relative low value from a lack of perspective change, however the angle from that specific seat allows light to land just right on the individual or item that is being captured and so the media is given a high rating. User rating allows human judgment on which pieces of content have value and can also be part of the priority ranking system to determine the order of media sent to users.

Additional factors that may be considered and compared in accordance with the invention include the identity of the user who is capturing the media, and what technology is being used when capturing media. Different users can affect the prioritization of media based upon their status or past history. Black-listed users can be banned, only allowed to participate in private events, or only allowed to participate in public events with certain forms of media. White-listed users could be users who have not been flagged for indecent content and have an established a network of contacts through their phonebook or social networks. Subtle indications that users may be inappropriate users are if their contacts from their phone or social networks have been flagged for indecent content. Indecent content can be anything that is considered offensive by the public, including racist, sexualized, or violent media. If the user constantly uses profanity in their texts, chats, tweets, etc., the user can also be ranked as more offensive. The status of the user that is capturing the media can be used as part of the priority ranking system to determine the prioritization of the media reply.

In addition the technology that is used when capturing media for an event can also be considered when organizing and prioritizing media. Not all media capture devices are the same. Some devices have extremely fast access to a network while others can only receive or send limited data. Other devices have slower processors that do not allow video to quickly be sent over a network or some have applications or operating systems that hinder the ability to broadcast media. Many devices do not have equivalent media capturing technology, such as the superior iPhone 4S camera versus the BlackBerry Torch 9800 camera. In addition, not all devices have equal capturing technology such as image stabilization or auto focus, so the device itself can be used as part of a ranking for quality of media captured. Devices and/or their attachments, applications, and operating systems can affect the quality of media seen by other users and can also be part of the ranking system to determine the order of media sent to users.

For devices that are not technologically superior to others, it is possible that the content captured could be of better quality due to environmental conditions and/or a user's ability. Thus, the quality of the content itself may also be considered and compared. For instance, a user that is holding up a tablet with a high-resolution camera may shake the device more than an individual holding up a phone with a low resolution camera. The device with cruder technology but is held more steadily may have preferred content as compared to the device with better technology. Characteristics such as camera stability, contrast, and focus can all be factors used in ranking images.

These characteristics can be automatically determined via algorithms to determine whether a picture or video was stable, out of contrast, or out of focus. Fast shifting devices that have movement sensors built within them such as gyroscope technology can add to the determination of the stability of the picture. In addition the sound captured can help determine the quality of the image, such as a clear sound signal of a performance means that there is a higher chance the user has a clear line of sight. The quality of the content captured can also be part of the ranking system to determine the media sent to users.

The prioritization and organization of existing related media can also be used to enhance the existing media to create new media or new media experiences that did not exist before. It is possible that from all the gathered visual and audio content, the visual and audio content obtained from each portable electronic device can be enhanced. For example, an algorithm can compare the various gathered content and then enhance a photo, video, or sound based upon information from the alternative content. For example, multiple sound feeds could come together and gather the clearest sound from all the feeds or using algorithms to pull the intended sound from the feeds, enabling a superior new sound to be created and used for a portion of an event.

An enhanced experience of the event can occur with superior viewing or listening technology with large bandwidth connection, such as a large monitor or multiple monitors showing all pieces of media from the event off of a portable computer or server. This can recreate the concert from all captured angles with all possible media for a very unique experience. Media does not necessarily have to be saved on the same server or storage location as other media. Instead, media may be saved to portable storage accounts that have been associated with the user. For instance, one could send a copy of portable recorded media to a Google cloud storage account while capturing an event. This data saved on a cloud storage device can be fed into the application and also receive the same tools offered by the application.

The prioritization and organization of existing related media can also be used with added effects creating different presentations of media. There can be added effects while experiencing the media either within or between each piece of media. For instance, when watching a live video broadcast the feed may change to another device and during this change the user may see a fade out of the previous video and a fade in of the next video. While these added effects may add aesthetic value they could also add a utility value as there may be needed time to load each new piece of media. For instance, all phones or some phones may not have the technology needed to allow the media to flow uninterrupted in a timeline sequence when either the media is changed by the user or if the media is changed by the server.

A special effect, commercial, or information, etc. can be used as a placeholder until the next piece of media loads. Each piece of media could also be shown in a different style to distinguish the category of the media. For instance, all comedic text could be in a large bubbly font while all dramatic text could be in italic. Also the ranking of the media could be shown either by stating the rank of the media while the media is playing or by adding another effect to the media such as a hue of color to acknowledge the ranking grade. Borders can be added to the playback of media or settings can be created on how media should be placed. Collages of media from the same event can also be shown at the same time with pictures from a user's private group flowing in and out on the bottom left hand side of the screen with video from the public call for media playing in the center and with text scrolling on the lower right of the screen. Live media or previously captured media can also be mashed together as a group or organized separately based upon a user's own presentation choice.

Users can create their own playback presentations that other users can experience or playback presentations can be created utilizing themes. For instance, users may also tag certain media allowing an easy categorizing of media for experiencing later. For instance, all the tweets and video that are tagged as funny can be played in chronological order all together. This is unique as one can experience the same event with multiple themes. Users can see the dramatic version of an event and also see the romantic version of the same event. The romantic version can have the chats (messages) between lovers over romantic photos taken from the event. The event coordinator can manually change the prioritization and organization of each piece of media and only authorize select presentations of the event.

The organization and prioritization of event related media could be prepared in advance or done in real time when the media is experienced. There can be multiple playlists available as each one can be relative to what the experiencing user desires out of the accessible media. It is possible that the user selects one of the playlists or one of the playlists is automatically selected for the user. The user's device can also be taken into consideration when experiencing event related media, as there are limitations to each device when experiencing the event related media. For instance, when experiencing media on a portable electronic device the limitation of bandwidth connection to the network and screen size must be taken into account.

If an event or location has multiple users capturing media, it may not be possible for all forms of media to be sent and viewed on all portable electronic devices. For example, not all smart phones currently have the connection speed and screen size to effectively view 100 live video broadcasts of an event at the same time. The amount of content that is sent to the portable electronic device may need to be limited so that the user can have a good experience of the event media. Not only must the content be more aligned to the user's possible interests, the user interface with the media must match the amount of content that the user is able to see on the device. At block 1315 the user's information, user's device, and network connection is received to further organize and prioritize media to tailor the presentation for the user that is interested in experiencing the media. The organization and prioritization of event related media can also be affected by the user's own interest/preferences along with the technology the user is experiencing the media with occurring at block 1320.

The organization and prioritization of media can be tailored to each user depending upon information that is provided in regards to the user as shown in block 1320. A user's interest/preferences, subscriptions, and history can affect the organization and prioritization of media as the playback can be tailored to each specific user. Also when the presentation is played, the type of media that is played, and the current location of the user experiencing the media can also affect the presentation. For instance, at a concert a user may not place much value on being able to see media captured from the seat behind the user. On the other hand, the user may value seeing the perspective from the front row, stage left, or stage right, or center rear. Each of these cameras has a unique perspective of the show and can be used as indicators to which content the user will receive.

Geolocation can allow each of the portable electronic devices to be tagged with a location and in turn can find the portable electronic devices in different areas of an event. Also geolocation can find where the user experiencing the media is currently located and start with media that is furthest away from where the user's current position is to give the user the most different perspective. A possible user interface can exist where users can see where each user is on a map of the event for each given type of media, such as the location of each user who is capturing video. It can be even more exact if a seat number is given to the application against a seating map of an event and the seat number shows the exact seat that a user is in. This type of ranking of media based upon location can be another determinant in the media that is presented to users. In conjunction with the user located at the event, the time of when the user is experiencing the media and the experienced media format being live, these factors can notify the a system of the invention to take into account the user location when organizing and prioritizing media for presentation to the user. In addition, the user's history can reveal a tendency to experience video media as opposed to pictures, so video will have a higher priority than pictures.

In FIG. 13, if a user is playing back an event for the prepared media presentations 1325, every time the event is played back on the device, the user can have a new experience by playing back a new sequence of content. Pieces of media, such as video, sound, and text, can be chosen whether to be incorporated into either broadcasts or playbacks, such as a user can choose to hear the sound and view the text coming from each user whose video is currently showing. Or the user can just choose to hear the sound and view the text, but not the video of an event. When watching a live event, the feed will automatically switch between the highest ranked cameras and perspectives. If a device that is capturing the media is dropped, the ranking system will automatically change the live feed to the next highest ranked camera. Media, whether for live or replayed events, sent to a device can have a various degradation of information to allow for improved performance. For instance, if a portable electronic device can view high resolution content but has a bad connection then the media sent to the user's device changes to a less resolution version until a good network connection is established. Also it is possible the queued feeds are too much information for the user's device to allow smooth playback of the current feed, so the information for the queued feeds can be consecutively minimized, such as the second feed can have 75% of the information and the third feed can have 50% of the information with the fourth feed having 25% of the information.

Due to the limitations of portable electronic devices such as bandwidth, screen size, processing power, memory, etc., the application can take the various details that determine the order of media sent to users and create a more enjoyable experience for a specific device. Instead of sending all event related media at any given moment of the event, some of which may have low utility for the user, the application can select which media to send the user on his/her device based on the presentations of media with the highest priority media of each type presented first 1325. The highest ranked media type means the highest priority media within each type of medium, such as the highest priority video out of all video at that specific moment to present to the user. The highest-ranking media will start playing on the users screen and the user can use the device's touch screen, if the device has one, to change the media to another piece of media in real time of the event. For instance, while watching the live event on a smart phone, a user can swipe across their phone to bring in another camera perspective of the event. By only sending specific media, there can be little to no break between the playing the new camera feed. It can be a smooth, fluid like experience of switching through media that is playing on a sequential timeline. When switching to another feed, each consecutive feed is media can have equal or less priority rank determined by the ranking system.

Figure 14:
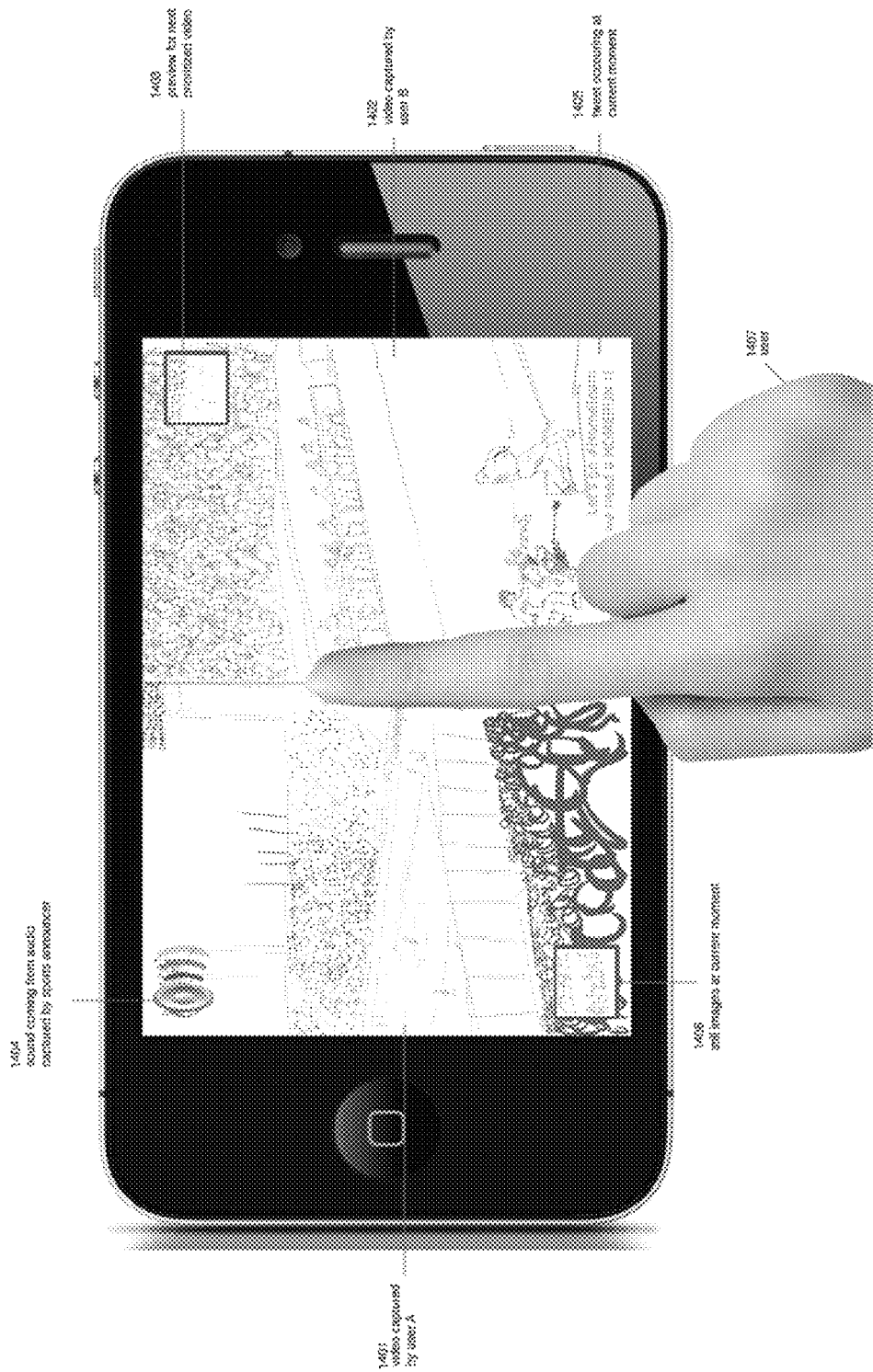
FIG. 14 illustrates an embodiment of a user interface and an exemplary manner of utilizing a swipe gesture across a touchscreen to change presented media to the next prioritized media.

FIG. 14 illustrates the user experience of switching to the next prioritized media in real time on a touchscreen device. For instance, if a user is watching a baseball game, the user can swipe across the screen in real time and see a completely new view of the batter without a break between the last video feed and the new video feed. The sound can be continuous, without any disruption, as the video can be the medium that is requested to change while all other mediums remain the same. In FIG. 14 a baseball game is being presented with a user's finger 1407 swiping over the screen of the device to change from video 1401 captured by user A to video 1402 captured by user B. The change between video feeds is occurring as the event is occurring, allowing there to be no break in the chronological playback of the game. This allows for different perspectives at nearly any moment of the game and could be occurring in real time as the game is happening live. Once the user has completed the swipe motion over the screen, not shown in FIG. 14, the video 1402 captured by user B will be the predominant video taking up the screen. 1403 shows a preview for the next prioritized video that will be displayed if the next video is chosen by swiping across the screen again.

In addition FIG. 14, shows the sound coming from a different source than both the video feeds at 1404 by directly coming from the sports announcer at the game. The sound is a higher prioritized sound than any of the video captured sounds and therefore chosen to play first. It is possible to also change the sound to the next prioritized sound or customize the player to play sound that is part of each video file. Also shown is a tweet, message, or text 1405 at any given moment during the event and 1406 shows any captured still images at any given moment. Any medium can be the main focus of the playback (take up a majority of the screen) and any medium can be changed to present the next prioritized media within that medium.

In one embodiment, this is achieved using a few streams of media being queued into the device, e.g., the next four swiped videos may be ready to play at any given time. As the event is playing on the device, the next queued media pieces are always changing to match wherever the timeline currently is. If there is a higher ranked piece of media for any given moment then any of the currently queued media or media that is playing, then the queued media or playback media can be replaced with the higher-ranking media. The automated switches between media can be regulated so that there is a minimum amount of time played for each media piece or else the media could constantly flutter between different pieces of media and disturb an otherwise enjoyable user experience, depending upon a particular user's preferences. The automated switches between media could also be done via special effect transitions such as fades or wipes so that the different media pieces flow together for an event instead of jumping from one piece of media to another.

Figure 15:
FIG. 15 illustrates an embodiment of a user interface showing exemplary media replies to a user's call for media for the invention as a mobile phone application.

FIG. 15 is an illustration of replies to a user's call for media for the invention as a mobile phone application. The display on the smart phone 1500 shows replies to a call for media "How is the Superstar show in Seoul, South Korea?" 1510. There are two media replies 1515 and 1525, media reply 1515 was submitted by user Superstar 1505 and media reply 1525 was submitted by user Julie Park 1520. User 1505 is the "Official Account" for the user Superstar, which can be a verified account that the user is who the user claims to be. The media reply 1515 can be the official media reply for this event, so when any users send a call for media for this event, the media reply 1515 appears. This can be set by the event coordinator for an event found within the relevant record in the call for media database 85 from Event Coordinator 234. An event coordinator can be established for a location or event and manages the media replies for a location or event. An event coordinator can also possibly administrate any calls for media for a location or event. The event coordinator can authorize official equipment (cameras, microphones, phones, etc.) that is used to obtain the official media for the event or location. For example, the sound and video can be obtained through official equipment and can be experienced by users as the official media. Users may only be able to add their tweets, chats, or comments underneath the official video and no other captured media for the event. Also it is possible that official media can be used as the only source for that specific content in the group, for instance the sound coming from the original microphone used by the artist could be the only sound that is heard by all the users for all captured media.

It is possible that event coordinators can also place information (notifications, goods/service to purchase, or any other content) before, during, or after any media shown from an event. For example, when a cameo guest appears on stage the name of the guest may be announced live through the application, or a shirt may be offered for sale every time a section of the event is replayed during and after the concert, etc. It is possible that event coordinators can preset times when information is released to users before, during, or after an event. For example, at 1 hour into the event a message can be sent to all users of the application to hold their cell phones in the air. It is possible that users can be notified individually or by group when they are to take action, such as to enter or exit certain locations. It is also possible that event coordinators can ban any media that they deem as not appropriate for the event by selecting specific content or banning the entire media obtained from a specific user or group. It is possible the event coordinators can have a list of specific individuals or groups to collect specific media types for the event. Both the ban of media and the list of authorized users can be recommended or voted upon, which can be automatically authorized or manually authorized by the event coordinator. It is important to note that FIG. 15 is merely an example of how to present media replies to calls for media. It is possible that both calls for media and media replies are presented in a calendar or timeline format to show information within a daily, weekly, monthly, or yearly format.

Figure 16:
FIG. 16 illustrates an embodiment of a user interface showing an exemplary message application for the invention as a mobile phone application.

FIG. 16 is an illustration of an embodiment of the invention used as a chat tool for a mobile phone application. The invention may be used as a standalone communication medium such as a new smartphone application or within an existing communication medium (i.e. email, messages, etc.). The menu choice selected for smartphone 1600 is "Event Chat" 1605. The event chat displays how an event chat system based upon the invention can work similar to the event option for creating a call for media. The "Direct Chat" 1615 menu option, not shown, is a direct chat system with users that also uses the invention in a similar manner to the direct option for creating a call for media. "Interests" 1610 menu option, not shown, is a way for users to setup and manage subscriptions within their relevant user record within the user database table 80 in Subscription Information 134.

Users may be given an option to follow other users and be notified when a user either calls or responds with media. A user can follow a friend and be notified each time a public call or response is made from the friend. Celebrities can exist on the social network and ask their following users to obtain media about an event or location, and all their followers can be notified that a call for media has occurred from the celebrity. Users can also follow certain locations or events and be notified when calls or responses have occurred for a location or event. Users can also be alerted when a media response occurs by specific users or groups, such as a user is alerted when live video is captured by a family member.

The social network can work with any platform such as Facebook or Path or possibly be incorporated within the system itself. Users can have different privacy settings to allow others to view, retrieve, or interact with certain information. An example of an event chat is Wes and Sarah's Wedding 1620, which is a private call for media and is occurring now at the Ritz Carlton, in Pasadena, Calif. 1625 is the last message sent for this event from Jennifer Smith stating "We need more pics/videos of the bride by herself." It is possible that a call for media can occur within a call for media, for instance Jennifer Smith can send out a call for media just for pics/videos of the bride during a certain part of the wedding in addition to setting up a call for media for the entire wedding. 1630 is a public event chat where it is possible to open up the chat to any user to comment upon. A call for media can covert at set times, such as when the event occurs to trigger all replies to media must now fit a certain restriction (i.e. only specific users can reply, only media from a certain location can reply, etc.). Calls for media can also have changing restrictions such as a the accepted distance from the location of the event for media replies keeps getting shorter as the event time approaches.

In an embodiment of the invention based upon a method and system of communication, a social network can exist for all users based upon the call and response for media. There can be social interaction between users beyond just calling and responding for media, such as generally sharing media, finding like individuals in the network, etc. Users can comment on the media of other users and there can be a social ranking of media and media responders. In order to better assess the value of media submitted, responders can be given values to help estimate the quality of their media. For instance, a responder that submits high quality media can be given a high value by other users, system administrators, or the system itself. The high value will automatically increase the chance that the next media that the user captures will also be of high value and will rank the media content higher than other users. There can be many possible ranking variables for responders such as their response time with media to a call or the amount of followers the responder has.

There are many different possible revenue streams and usages for embodiments of the invention. User information can be valuable, including the user's demographic information, actions, interaction with other users, etc., which can lead to targeted marketing similar to revenue streams for social networks. For instance, users that are requesting media from certain locations such as restaurants can be targeted with advertisement from that specific restaurant or establishments that serve similar cuisine. Users can pay to be event coordinators for a specific location or event. Users that reply with media for a specific event, such as attending an alternative rock concert, can be suggested to attend similar events that will be occurring in that area. Events or locations can be sponsored by requests for media being sent to users that draws the attention of users to an event or location.

Users could also pay to customize how media is shown for a location or event is shown to users, such as filtering media that is shown to users of an event or location. In order to insure a certain perspective or maintain a certain quality of media, a specific camera or media can be utilized by an event or location, which could cost a premium. There could be advertisement before, during or after media that is shown to users, for example a commercial for Sizzler could play before media is shown of a fishing trip. Celebrities or brands can pay to make certain calls that can cause exposure for an individual, product, or brand. Call and response for media can be used for advertising and marketing, allowing discounts for users that participate or donations to a political campaign. Products themselves such as services (event tickets, certificates, etc.) or tangible goods (food, consumer goods, etc.) can be sold via this invention or gifted to others.

The process of creating calls for media and making media replies for an event or location may also have value. Users may have to pay to request media from specific users or certain groups or for specific events or locations. Users may also have to pay to capture media with specific users or certain groups or for specific events or locations. Users may also have to pay to experience media in a specific way; such as high quality video may cost more than simply looking at pictures for an event. Each user may have a limit to how much media they can capture or view, which can be done via file size, type of media, or number of media. Users could also pay to customize how media is shown for a location or event is shown to users by paying for added effects or customized presentations of media to users. For a call for media, users could pay for media restrictions, such as forcing only certain media replies to be accepted for an event or only allowing certain technology to be used for media replies.

Users could also be charged to search through user information and also be charged when searching through media information. Media searches can be done to look for specific brands, products, people, locations, times, events, etc. Users can pay to change information currently associated with user information or media information. Users may have to pay for an enhancement of media, such as media that is cleaned by electronic filters or by multiple pieces of media that are utilized together to make media cleaner or clearer.

In addition, pooled media for an event can be sold, for instance the video, pictures, or texts gained from multiple user electronic devices at a concert can be utilized in a live or recorded presentation of the concert that is sold to consumers. The combined media gained can be used together or separately, for instance the combined audio feed from multiple sources can be used to create a surround sound experience for the concert that could be sold to consumers. The above are just a few examples of revenue streams, and in no way represents all the possible revenue streams that can be created from this system and method.

Those skilled in the art will appreciate that alternative embodiments exists from the description herein of the invention or inventions without departing from the spirit and scope of the invention. The invention may be implemented as a method or apparatus, a series of instructions contained in computer-readable media, article of manufacture or a combination thereof, etc., using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, media (i.e. magnetic storage media), "floppy disk", CD-ROM, cloud storage, a file server providing access to the program via a network transmission line, holographic unit, etc. Of course, those skilled in the art will recognize that many modifications may be made to this configuration without departing from the scope of the invention or inventions.

The invention has been shown in the context of a network system, where all of the communications were performed through the Internet. However, in alternative embodiments, many of the functions can be performed by other means of communication such as telephone, fax, radio, etc. For example, the user creating the media call may directly call friends to verbally let them know of a call for media.

The invention has been described with respect to the database interface 65 sending calls for media, receiving media replies, etc. However, in alternative embodiments, some of the functions of the database interface may be implemented in a separate script program or eliminated altogether. Alternatively, the functions shown may be combined or split in any manner amongst one or more systems.

Additionally, the invention has been described with respect to four choices that are presented to users to create a call for media, however there are other convenient methods of creating a call for media. In addition, the various operations, processes, and methods disclosed herein can be performed across different electronic devices and in any order.

Moreover, the invention has been described with respect to users submitting media replies in response to a call for media. The server itself, however, can proactively search for media relevant to the call for media. In further embodiments, the present invention automatically searches for existing media that relates to an event. The server can automatically search for all related media from the details provided about the event and return with media that is possibly related to the event. The search can be performed internally within a system, within third party accounts the user may have access to across different platforms and systems, and in any existing media databases. The search can also be done externally searching for media across the Internet and utilizing multiple programs to find related media.

In addition, the invention has been described in the context of the user and call for media or event information being implemented as database records in a database table. However, the user and call for media or event information may be implemented in any format for maintaining object information, including spreadsheet, non-database table, etc. Thus, as used herein, the terms database record, database table, and database refer to any data structure known in the art for maintaining information on data objects, such as relational databases, non-relational databases, spreadsheets, ASCII text files, etc.

Therefore, the description herein of embodiments of the invention has been presented for the purposes of illustration and description. It is not intended to be exhaustive or to limit the invention to the precise forms disclosed. Nor does the use of the singular term "invention" indicate that the invention(s) disclosed herein are necessarily limited in any way in scope or number. Many modifications and variations are possible in light of the teachings herein. It is intended that the scope of the invention be limited not by this detailed description, but rather by the claims appended hereto. The above specification, examples, and data provide a complete description of the manufacture and use of the composition of the invention. Since many embodiments of the invention can be made, the concepts, methods, systems and apparatus disclosed may be used in countless other applications not expressly mentioned herein without departing from the spirit and scope of the invention, as the invention resides in the claims hereinafter appended.

What is claimed is:

1. A computer implemented communication method, comprising:
    providing access to a call for media database implemented on a server, the call for media database including at least one call for media record;

enabling a first user to request creation of a call for media that is associated with the at least one call for media record;

receiving from the first user a designation of a select geographic area to which the call for media is to be sent;

sending out the call for media associated with the at least one call for media record to users within the select geographic area;

enabling a user to subscribe to a geographic area;

notifying the subscribing user of calls for media or media related to the subscribed-to geographic area based upon the subscription;

receiving a plurality of media in response to the call for media associated with the at least one call for media record;

pooling the plurality of media received over a period of time in response to the call for media associated with the at least one call for media record;

updating the at least one call for media record with the media received by associating the media received with the at least one call for media record; and allowing access to the media received that has been associated with the at least one call for media record.

2. The computer implemented communication method of claim 1, further comprising:

enabling a user to view existing calls for media for a geographic area.

3. The computer implemented communication method of claim 1, wherein one or more media restrictions are set for the call for media, the one or more media restrictions being within one or more of the following categories: media type, media format, media data size, media length, media quality, media capture location, and media capture time.

4. The computer implemented communication method of claim 1, further comprising:

enabling the first user to designate the select geographic area for which to request creation of a call for media via a map-based user interface.

5. The computer implemented communication method of claim 1, wherein one or more predetermined conditions are involved in the creation of the call for media.

6. The computer implemented communication method of claim 5, wherein the one or more predetermined conditions are user conditions that comprise one or more of a location, information, activity, history, interests, user preferences, or a relationship between users.

7. The computer implemented communication method of claim 1, wherein the first user or information of another user is involved in determining recipients for the call for media.

8. The computer implemented communication method of claim 3, wherein the first user or information of another user is involved in determining the one or more media restrictions for the call for media.

9. The computer implemented communication method of claim 1, wherein the first user and the subscribing user are the same user.

10. The computer implemented communication method of claim 1, further comprising:

enabling the subscribing user to subscribe to a specific keyword; and notifying the subscribing user of calls for media or media related to the specific keyword based upon the subscription by the subscribing user to the specific keyword.

11. The computer implemented communication method of claim 1, further comprising:

enabling the subscribing user to subscribe to specific other users; and notifying the subscribing user about activity of the specific other users based upon the subscription by the subscribing user to the specific other users.

12. The computer implemented communication method of claim 1, wherein the plurality of media comprises image media, video media, or audio media.

13. The computer implemented communication method of claim 1, wherein the plurality of media comprises text media.

14. The computer implemented communication method of claim 1, further comprising:

searching for related media to obtain the plurality of media.

15. The computer implemented communication method of claim 3, further comprising:

identifying received media that does not match media restrictions set for the call for media associated with the at least one call for media.

16. The computer implemented communication method of claim 1, further comprising:

presenting to the first user a plurality of events for which to make the call for media.

17. The computer implemented communication method of claim 16, further comprising:

enabling the first user to add a new event to the plurality of events.

18. The computer implemented communication method of claim 1, further comprising:

enabling the first user to submit a user event for which to make the call for media.

19. The computer implemented communication method of claim 1, further comprising:

broadcasting a notification of the call for media to the select geographic area.

20. The computer implemented communication method of claim 1, further comprising:

informing a second user of one of the call for media, an event, available media based upon one of the location of the second user, information about the second user, activity of the second user, history of the second user, interests of the second user, and preferences of the second user.

21. The computer implemented communication method of claim 1, wherein a responding user is compensated for replying to a call for media from another user.

22. The computer implemented communication method of claim 1, wherein a device with which a responding user captures media allows only specific media to be submitted in response to the call for media based upon a media restriction set for the call for media.

23. The computer implemented communication method of claim 1, wherein the plurality of media is automatically altered to fit the media restriction set for the call for media associated with the at least one call for media record.

24. A computer implemented communication method, comprising:

providing access to a call for media database implemented on a server, the call for media database including at least one call for media record;

enabling a user to submit instructions to request creation of a call for media that is associated with the at least one call for media record;

sending out the call for media associated with the at least one call for media record, the call for media being sent to users in a select geographic area in accordance with instructions received from the user;

restricting media responses to the call for media by comparing against a media restriction set for the call for media associated with the at least one call for media record to determine whether media in a response is allowed media;

receiving a plurality of allowed media in response to the call for media associated with the at least one call for media record;

pooling the plurality of allowed media received over a period of time in response to the call for media associated with the at least one call for media record;

updating the associated call for media record with the media received by associating the allowed media with the at least one call for media record; and allowing access to the media received that has been associated with the at least one call for media record.

25. The computer implemented communication method of claim 24, wherein one or more media restrictions are set for the call for media, the one or more media restrictions being within one or more of the following categories: media type, media format, media memory size, media length, media quality, media capture location, and media capture time.

26. The computer implemented communication method of claim 24, further comprising:

receiving from the user instructions to request the creation of the call for media, wherein the instructions include a media inquiry associated with the at least one call for media record.

27. The computer implemented communication method of claim 26, the enabling step comprising:

serving to a device of the user program instructions utilized to present a graphical user interface through which the user requests the creation of the call for media.

28. The computer implemented communication method of claim 27, further comprising:

providing to the user via the graphical user interface a list of options from which the media inquiry is selected.

29. The computer implemented communication method of claim 24, further comprising:

determining recipients for the call for media based upon information of the user or another user.

30. The computer implemented communication method of claim 24, wherein the plurality of allowed media comprises image media, text, video media or audio media.

31. The computer implemented communication method of claim 24, further comprising:

broadcasting a notification of the call for media to the select geographic area.

32. The computer implemented communication method of claim 24, further comprising:

searching for related media to add to the plurality of allowed media in response to the call for media.

33. The computer implemented communication method of claim 24, further comprising:

presenting to the first user a plurality of events for which to make the call for media; and receiving from the first user a selection of one of the plurality of events as the instructions to request creation of the call for media.

34. The computer implemented communication method of claim 24, further comprising:

informing a second user of one of the call for media, an event, available media based upon one of the location of the second user, information about the second user, activity of the second user, history of the second user, interests of the second user, and preferences of the second user.

* * * * *